US009467929B2

(12) United States Patent
Sekine

(10) Patent No.: US 9,467,929 B2
(45) Date of Patent: Oct. 11, 2016

(54) WIRELESS TERMINAL, INFORMATION PROVIDING METHOD, AND INFORMATION PROVIDING SYSTEM

(71) Applicant: YAHOO JAPAN CORPORATION, Tokyo (JP)

(72) Inventor: Yuki Sekine, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 99 days.

(21) Appl. No.: 14/152,216

(22) Filed: Jan. 10, 2014

(65) Prior Publication Data
US 2014/0211645 A1 Jul. 31, 2014

(30) Foreign Application Priority Data

Jan. 25, 2013 (JP) ................................. 2013-012548

(51) Int. Cl.
G01R 31/08 (2006.01)
H04W 48/12 (2009.01)

(52) U.S. Cl.
CPC .................................... H04W 48/12 (2013.01)

(58) Field of Classification Search
None
See application file for complete search history.

(56) References Cited

U.S. PATENT DOCUMENTS

| 2004/0106379 | A1* | 6/2004 | Zen ....................... H04W 48/20 455/67.11 |
| 2004/0192342 | A1* | 9/2004 | Ranganathan ...... H04L 65/4092 455/456.1 |
| 2005/0073521 | A1* | 4/2005 | Watanabe et al. ............ 345/440 |
| 2006/0164302 | A1* | 7/2006 | Stewart ................... H04L 29/06 342/386 |
| 2007/0214040 | A1* | 9/2007 | Patel ...................... G06Q 30/02 705/14.17 |
| 2007/0249386 | A1* | 10/2007 | Bennett ....................... 455/550.1 |
| 2007/0265003 | A1* | 11/2007 | Kezys ..................... H04L 12/66 455/435.1 |
| 2009/0190553 | A1* | 7/2009 | Masuda ................ H04W 8/005 370/331 |
| 2010/0165857 | A1* | 7/2010 | Meylan et al. ............... 370/252 |
| 2010/0190449 | A1* | 7/2010 | Suzuki .................... H04W 4/02 455/67.11 |
| 2011/0237254 | A1* | 9/2011 | Lee ....................... H04N 21/234 455/435.2 |

(Continued)

FOREIGN PATENT DOCUMENTS

JP A-2005-107897 4/2005
JP 2006025003 A 1/2006

(Continued)

OTHER PUBLICATIONS

Aug. 5, 2014 Office Action issued in Japanese Application No. 2013-012548.

Primary Examiner — Gregory Sefcheck
Assistant Examiner — Jael Ulysse
(74) Attorney, Agent, or Firm — Oliff PLC

(57) ABSTRACT

A wireless terminal according to an embodiment includes a display unit, a wireless LAN communication unit, a wireless WAN communication unit, and a control unit. The control unit acquires, when a radio wave intensity of a wireless signal output from a wireless LAN access point detected by the wireless LAN communication unit satisfies a predetermined condition, notification information corresponding to the wireless LAN access point by the wireless WAN communication unit or by the wireless LAN communication unit, and to indicates the notification information with an indication unit.

15 Claims, 18 Drawing Sheets

(56) References Cited

U.S. PATENT DOCUMENTS

| | | | | |
|---|---|---|---|---|
| 2012/0170513 A1* | 7/2012 | Vogedes | ............... | H04W 24/02 370/328 |
| 2012/0190339 A1* | 7/2012 | Abe | ..................... | H04W 48/16 455/411 |
| 2012/0310746 A1* | 12/2012 | Zhao | ..................... | G06Q 30/02 705/14.66 |
| 2013/0003703 A1* | 1/2013 | Todd et al. | ................... | 370/331 |
| 2013/0100819 A1* | 4/2013 | Anchan | ................ | H04W 48/20 370/241 |

FOREIGN PATENT DOCUMENTS

| | | |
|---|---|---|
| JP | 2006295961 A | 10/2006 |
| JP | 2011124755 A | 6/2011 |

* cited by examiner

FIG.3
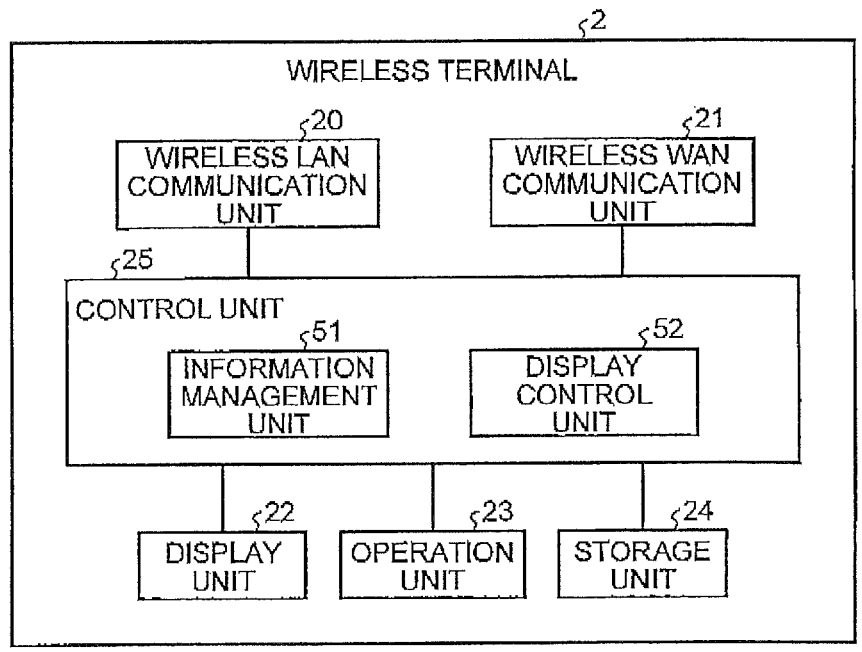
FIG.4
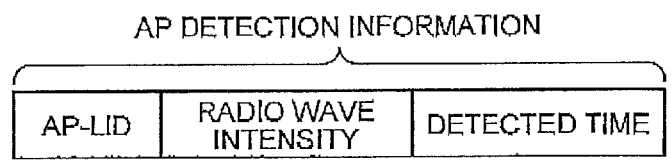
AP DETECTION INFORMATION
| AP-LID | RADIO WAVE INTENSITY | DETECTED TIME |
FIG.5
| AP-LID | AVERAGE RADIO WAVE INTENSITY | AVERAGE STAY TIME | THE NUMBER OF ENTRANCE |
|---|---|---|---|
| AL1 | 10 | 30 SECONDS | ONCE |
| AL3 | 6 | ONE MINUTE AND 20 SECONDS | TWICE |
| AL4 | 2 | FIVE SECONDS | ONCE |
| ⋮ | ⋮ | ⋮ | ⋮ |

FIG.6
| RANK | AP-LID | COMMUNICATION MEDIUM |
|------|--------|----------------------|
| 1 | AL1 | LAN |
| 2 | AL6 | LAN |
| 3 | AL5 | LAN |
| 4 | AL3 | WAN |
| 5 | AL7 | WAN |
| ... | ... | ... |
FIG.7
(a)
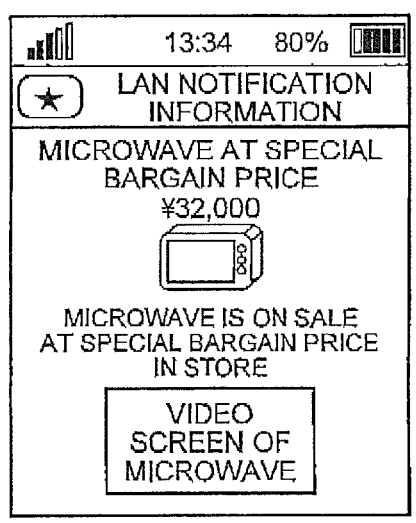
(b)
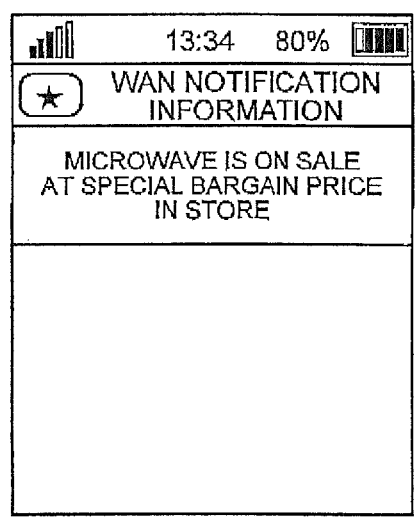

FIG.9

| AP-WID | TERMINAL ID | CHECK-IN TIME | CHECK-OUT TIME | RADIO WAVE INTENSITY |
|---|---|---|---|---|
| AW1 | T1 | 2/1/2013 12:28:50 | — | 10 |
| | T2 | 2/1/2013 12:21:34 | — | 2 |
| | T3 | 2/1/2013 12:13:56 | — | 1 |
| | T4 | 2/1/2013 12:39:08 | — | 5 |
| | ⋮ | ⋮ | ⋮ | ⋮ |
| AW2 | T7 | 2/1/2013 12:33:15 | — | 3 |
| | T8 | 2/1/2013 12:38:53 | — | 7 |
| | ⋮ | ⋮ | ⋮ | ⋮ |
| ⋮ | ⋮ | ⋮ | ⋮ | ⋮ |

FIG.10

| USER ID | TERMINAL ID | WAN-ID | NOTIFICATION OBJECT AP ||||| 
|---------|-------------|--------|---------------------------------|---|---|---|---|
|         |             |        | LAN NOTIFICATION OBJECT AP ||| WAN NOTIFICATION OBJECT AP ||
| U1 | T1 | W1 | AL1 | AL2 | ... | AL4 | AL7 | ... |
| U2 | T2 | W2 | AL1 | AL4 | ... | AL10 | AL14 | ... |
| . | . | . | . | . | . | . | . | . |

FIG.11

| AP-LID | AP-WID | LOCATION NAME | LAN NOTIFICATION INFORMATION | WAN NOTIFICATION INFORMATION | LOCATION INFORMATION |
|--------|--------|---------------|------------------------------|------------------------------|----------------------|
| AL1 | AW1 | A STORE | noticeA11.data | noticeA12.data | infoA1.data |
| AL2 | AW2 | B STORE | noticeA21.data | noticeA22.data | infoA2.data |
| . | . | . | . | . | . |

FIG.17

| USER ID | TERMINAL ID | WAN-ID | NOTIFICATION OBJECT CANDIDATE AP ||||| KEYWORD |
|---|---|---|---|---|---|---|---|---|
| | | | LAN NOTIFICATION OBJECT CANDIDATE AP ||| WAN NOTIFICATION OBJECT CANDIDATE AP ||| |
| U1 | T1 | W1 | AL1 | AL2 | ... | AL4 | AL7 | ... | CHINESE FOOD |
| U2 | T2 | W2 | AL1 | AL4 | ... | AL10 | AL14 | ... | BICYCLE |
| ... | ... | ... | ... | ... | ... | ... | ... | ... | ... | ial

WIRELESS TERMINAL, INFORMATION PROVIDING METHOD, AND INFORMATION PROVIDING SYSTEM

CROSS-REFERENCE TO RELATED APPLICATIONS

The present application claims priority to and incorporates by reference the entire contents of Japanese Patent Application No. 2013-012548 filed in Japan on Jan. 25, 2013.

BACKGROUND OF THE INVENTION

1. Field of the Invention

The present invention relates to a wireless terminal, an information providing method, and an information providing system.

2. Description of the Related Art

In recent years, a wireless local area network (LAN) communication has rapidly spread. Wireless LAN access points are installed in various places such as stations, airports, and stores, and a wireless LAN communication function has been equipped with various mobile devices such as personal computers, mobile phone devices, and portable game devices as a standard function. Such wireless LAN communication is expected to further spread, and users of the mobile devices that are wireless terminals are expected to be able to use a connection environment to the high-speed Internet in more various locations.

In such a communication environment, for example, Japanese Laid-open Patent Publication No. 2005-107897 discloses a technology in which, when a wireless terminal existing in an access point is detected, information corresponding to the access point is notified from an information distribution control device to a wireless terminal by an e-mail.

However, in the above conventional technology, the information corresponding to the access point is transmitted by an e-mail. Therefore, the information may not be promptly delivered. Therefore, transmission of the information from the information distribution control device to the wireless terminal through the access point can be considered.

However, when the user of the wireless terminal moves in communication areas of a large number of access points, information corresponding to the large number of access points is displayed in the wireless terminal. Therefore, the user of the wireless terminal may have an unpleasant feeling, similarly to a spam mail.

SUMMARY OF THE INVENTION

According to an exemplary embodiment, a wireless terminal includes a wireless LAN communication unit, a wireless WAN communication unit, and a control unit. The control unit acquires, when a radio wave intensity of a wireless signal output from a wireless LAN access point detected by the wireless LAN communication unit satisfies a predetermined condition, notification information corresponding to the wireless LAN access point by the wireless LAN communication unit or the wireless WAN communication unit, and indicates the notification information in the indication unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating a specific configuration example of a wireless terminal illustrated in FIG. 2;

FIG. 4 is a diagram illustrating a configuration of AP detection information stored in a storage unit of the wireless terminal;

FIG. 5 is a diagram illustrating an example of an AP terminal information table stored in the storage unit of the wireless terminal;

FIG. 6 is a diagram illustrating an example of a notification AP terminal information table stored in the storage unit of the wireless terminal;

FIGS. 7A and 7B are diagrams illustrating screen examples in which information provided from an information providing apparatus is displayed in an indication unit of the wireless terminal;

FIG. 9 is a diagram illustrating an example of a terminal information table stored in a location information DB;

FIG. 10 is an example of a user information table stored in a user information DB;

FIG. 11 is a diagram illustrating an example of a location information table stored in the location information DB;

FIG. 17 is a diagram illustrating an example of a user information table stored in a user information DB according to the second embodiment;

DETAILED DESCRIPTION OF THE PREFERRED EMBODIMENTS

Hereinafter, embodiments of a wireless terminal, an information providing method, and an information providing system according to the present application will be described in detail with reference to the drawings. Note that the wireless terminal, the information providing method, and the information providing system according to the present application are not limited by the embodiments.

1. First Embodiment

1.1. Information Providing System

Figure 1A:
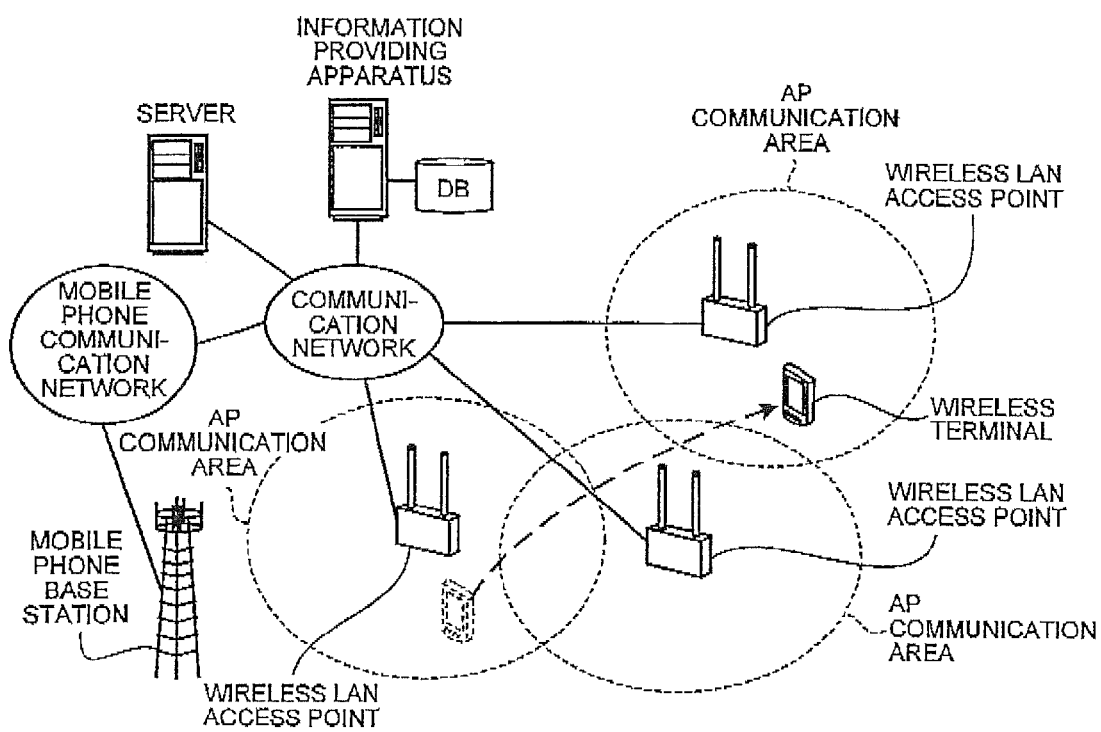
FIG. 1A is a diagram illustrating a configuration of an information providing system according to a first embodiment.

First, a configuration of an information providing system according to a first embodiment will be described. FIG. 1A is a diagram illustrating a configuration of an information providing system of an embodiment.

As illustrated in FIG. 1A, an information providing system according to the first embodiment includes a plurality of wireless local area network (LAN) access points and an information providing apparatus. The wireless LAN access points and the information providing apparatus are connected through a communication network. The communication network is, for example, an Internet protocol (IP) network such as the Internet.

A mobile phone communication network that is a wide area network (WAN) is connected to the communication network through a gateway server (not illustrated), and a mobile phone base station (an example of a wireless WAN base station) is connected to the mobile phone communication network.

The wireless LAN access point includes a wireless LAN communication unit, and can mutually perform wireless communication with a wireless terminal by the wireless LAN communication unit. The wireless LAN access point covers, as a wireless LAN communication area (hereinafter, described as AP communication area), commercial spaces such as a station, a shopping street, and an event site where concerts and sports are performed, in addition to a store, a restaurant, a beauty salon, a barber, a hospital, a hotel, a movie theater, and a complex leisure facility.

Further, the wireless LAN access point includes a communication unit connected with the communication network and has a relay function to relay transmission/reception data between a wireless terminal and a communication network side. A communication network-side device is, for example, the information providing apparatus or a web server (for example, a web site) connected to the communication network.

The information providing apparatus includes a database (hereinafter, described as DB) that stores LAN notification information and WAN notification information corresponding to the wireless LAN access point. The LAN notification information is information notified from the wireless LAN access point, and the WAN notification information is information notified from the mobile phone base station.

The information providing apparatus acquires, from the DB, and transmits, to the wireless terminal that has entered an AP communication area of a wireless LAN access point, one of the LAN notification information and the WAN notification information corresponding to the wireless LAN access point where the wireless terminal exists.

The wireless terminal can transmit/receive data to/from the communication network-side device through the mobile phone base station. Further, the wireless terminal is a mobile phone device equipped with a wireless LAN communication function, and can transmit/receive data to/from the communication network-side device through the wireless LAN access point in the AP communication area of the wireless LAN access point.

The wireless terminal detects a radio wave intensity of a wireless signal transmitted from a wireless LAN access point, and determines a wireless LAN access point in which the radio wave intensity of the wireless signal satisfies a predetermined condition as an object from which the notification information is acquired (hereinafter, described as notification acquisition object). For example, the wireless terminal determines, as the notification acquisition object, a wireless LAN access point falling within a predetermined higher rank in a ranking determined on the basis of the radio wave intensity of the wireless signal.

When having entered the AP communication area of the wireless LAN access point determined as the notification acquisition object, the wireless terminal acquires, outputs, and displays the notification information from the information providing apparatus through the wireless LAN access point or the mobile phone base station.

1.2. Information Providing Method

Figure 1B:
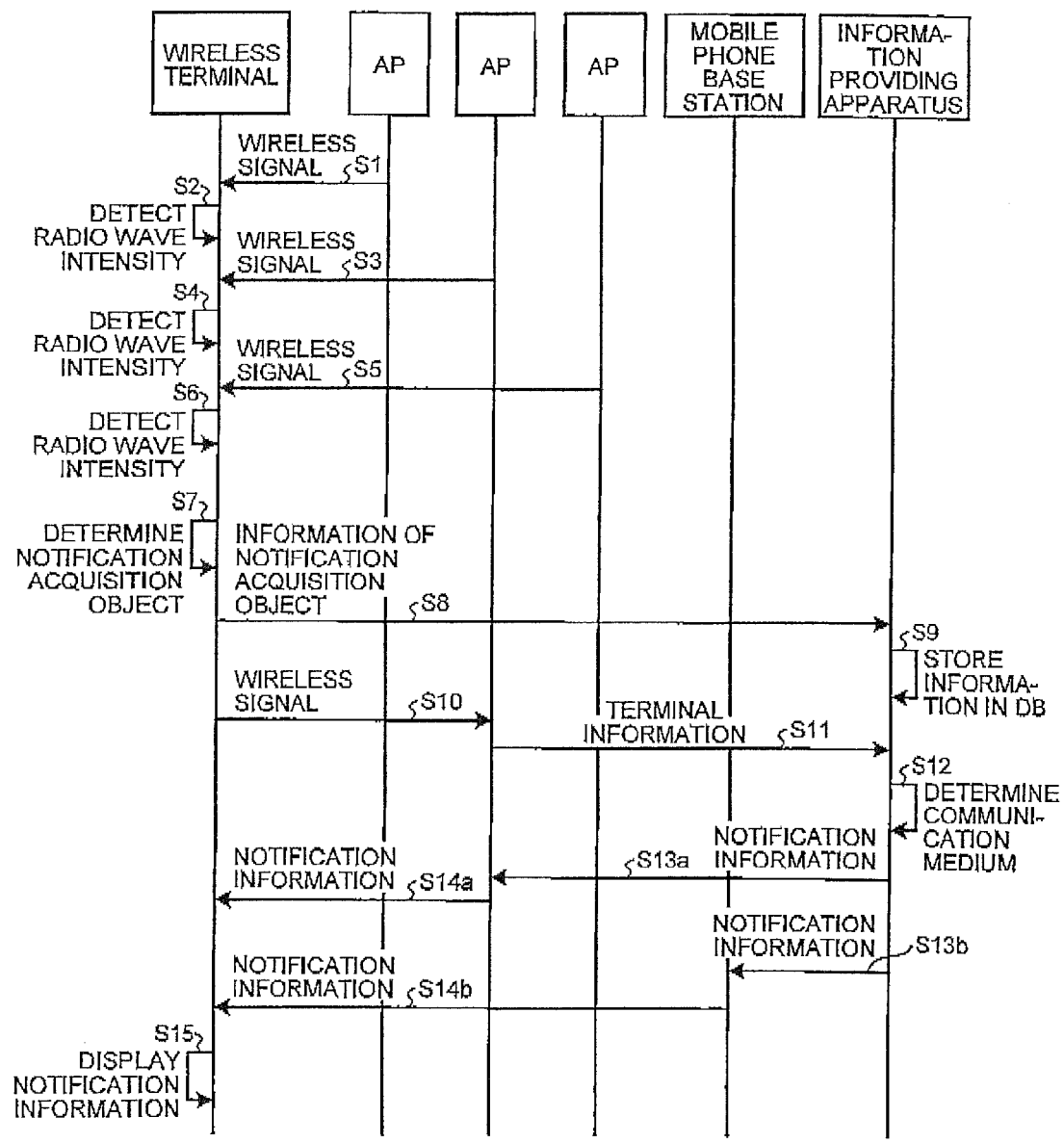
FIG. 1B is an explanatory diagram of an information providing method by the information providing system illustrated in FIG. 1A.

Next, an example of an information providing method by the information providing system according to the first embodiment will be described. FIG. 1B is an explanatory diagram of an information providing method according to the first embodiment.

When a user of the wireless terminal (hereinafter, may be described as terminal user) passes through a plurality of AP-communication areas, as described in FIG. 1B, a control unit of the wireless terminal receives wireless signals from the plurality of wireless LAN access points (a plurality of APs in FIG. 1A) (steps S1, S3, and S5), and detects the radio wave intensity of the wireless signals (steps S2, S4, and S6). The control unit of the wireless terminal stores information on the detected radio wave intensity in a storage unit. Note that, here, as an example, the radio wave intensity of the wireless signals respectively received from twenty wireless LAN access points are detected.

Following that, the control unit of the wireless terminal determines a wireless LAN access point that is to serve as a notification acquisition object (step S7). In the processing, the control unit of the wireless terminal determines, as the notification acquisition object, a wireless LAN access point falling within the predetermined higher rank K1 in the ranking determined on the basis of the information on the radio wave intensity of each wireless LAN access point stored in the storage unit.

As described above, the notification information includes the LAN notification information and the WAN notification information, and the control unit of the wireless terminal determines, as the notification acquisition object of the LAN notification information, a wireless LAN access point falling within a predetermined highest rank K2 (for example, within the third rank) in the ranking determined on the basis of the radio wave intensity of the wireless signal. Further, the control unit of the wireless terminal determines, as the notification acquisition object of the WAN notification information, a wireless LAN access that is in the predetermined higher rank K1 (for example, within the fifth rank) or more, and in less than the predetermined highest rank K2 in the ranking determined on the basis of the radio wave intensity of the wireless signal.

The control unit of the wireless terminal transmits information on the notification acquisition object to the information providing apparatus (step S8), and the control unit of the information providing apparatus stores the information on the notification acquisition object acquired from the wireless terminal in the DB (step S9). The information on the notification acquisition object includes a terminal ID of the wireless terminal, identification information of the wireless LAN access point, and a type of the notification information.

Following that, when having entered the AP communication area of the wireless LAN access point determined as the notification acquisition object, the control unit of the wireless terminal outputs a wireless signal to the wireless LAN access point (step S10). The wireless signal includes the terminal ID of the wireless terminal, and when having acquired the wireless signal from the wireless terminal, the wireless LAN access point transmits terminal information including the acquired information to the information providing apparatus (step S11).

When having determined that the wireless LAN access point having transmitted the terminal information is the wireless LAN access point serving as the notification acquisition object, on the basis of the information on the notification acquisition object stored in the storage unit, the information providing apparatus determines a communication medium to be transmitted to the wireless terminal having entered the wireless LAN access point (step S12).

In the processing of step S12, when the wireless LAN access point is specified by the information on the notification acquisition object, the information providing apparatus transmits the LAN notification information to the wireless LAN access point (step S13a), and causes the wireless LAN access point to notify the wireless terminal of the notification information (step S14a). Meanwhile, when the mobile phone base station is specified by the information on the notification acquisition object, the information providing apparatus transmits the notification information directing the wireless terminal from the communication network to the mobile phone communication network (step S13b), and causes the mobile phone base station to notify the wireless terminal of the notification information (step S14b).

When having received the notification information from the wireless LAN access point or the mobile phone base station, the wireless terminal indicates the notification information in the indication unit (step S15). The notification information displayed as described above is notification information corresponding to the wireless LAN access point that has detected the wireless terminal. For example, information related to an "A store" that is an installation location of the wireless LAN access point (hereinafter, may be described as AP installation location) is indicated in the indication unit of the wireless terminal as the notification information. Note that, when the notification information is image information, an image based on the image information is indicated in the indication unit, and when the notification information is sound information, a sound based on the sound information is output from the indication unit. Further, when the notification information is vibration information, a vibration based on the vibration information is output from the indication unit.

Further, when having acquired the notification information, the wireless terminal may notify the acquisition of the notification information from the indication unit. For example, when having acquired the notification information, the wireless terminal may notify the acquisition of the notification information by an output of a sound, by an output of a vibration, or by both of the outputs of a sound/vibration.

As described above, in the information providing system according to the first embodiment, when the wireless terminal enters the AP communication area of the wireless LAN access point, the notification information corresponding to the wireless LAN access point is notified to the wireless terminal.

Therefore, for example, when a wireless LAN access point is installed in a store, information on the store can be notified to the terminal user who has entered the store, whereby the information on the store can be effectively notified to the terminal user. Further, for the wireless terminal user, information irrelevant to the store that the user entered is not disorderly notified, and the terminal user does not have an unpleasant feeling.

Furthermore, in the wireless terminal according to the first embodiment, when having entered the AP communication area of the wireless LAN access point in which the radio wave intensity of the wireless signal received from the wireless LAN access point satisfies a predetermined condition, the wireless terminal acquires, and indicates the notification information corresponding to the wireless LAN access point.

Therefore, the terminal user can avoid a situation in which the notification information corresponding to the wireless LAN access point that the terminal user has entered is indicated in the wireless terminal without any restriction, and whereby the notification of information to the terminal user can be properly performed.

Hereinafter, a specific configuration and specific processing of the information providing system will be more specifically described with reference to the drawings.

1.3. Specific Configuration of Information Providing System

Figure 2:
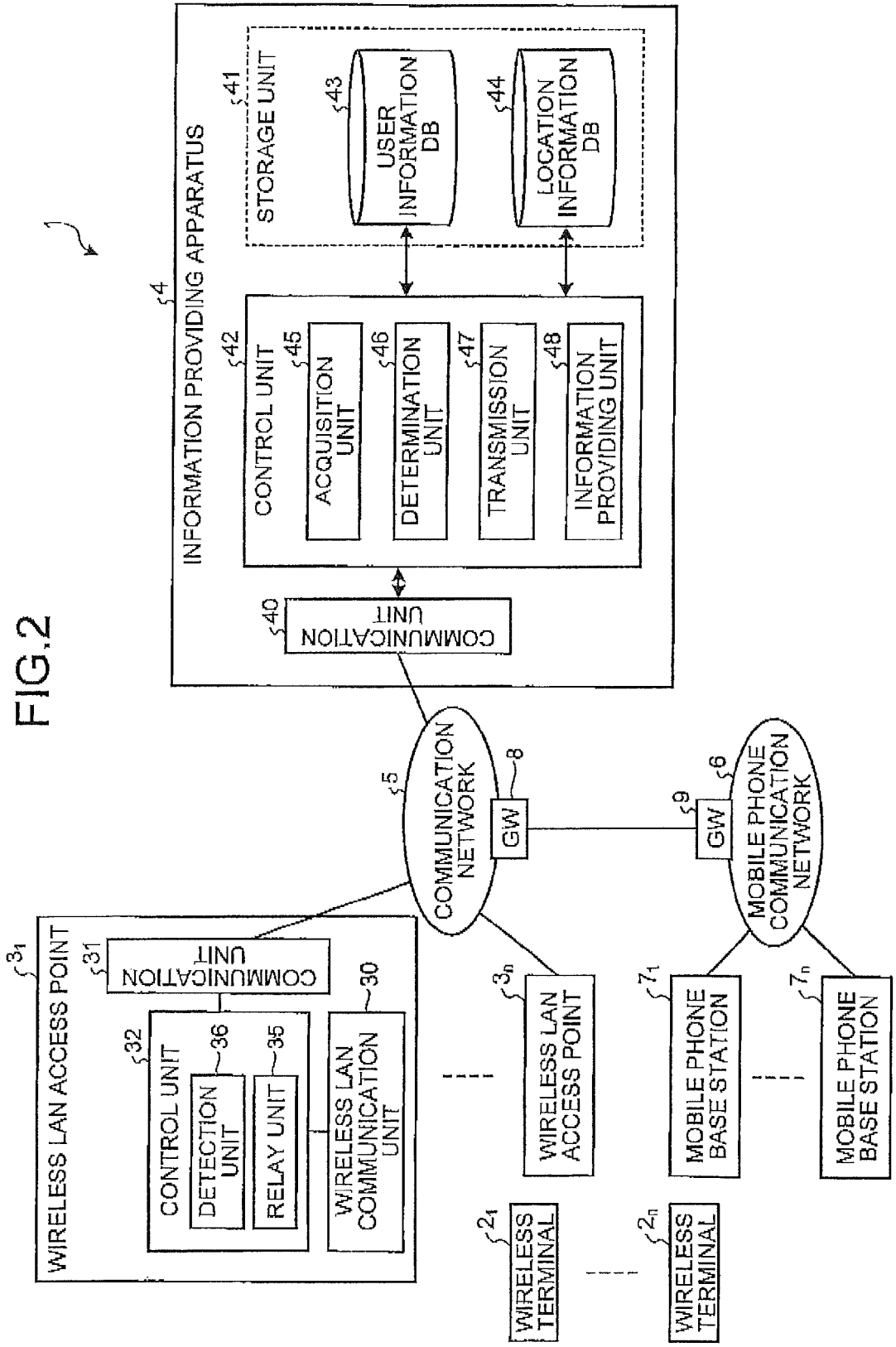
FIG. 2 is a diagram illustrating a specific configuration example of the information providing system according to the first embodiment.

A specific configuration example of the information providing system according to the first embodiment will be described with reference to FIG. 2. FIG. 2 is a diagram illustrating a specific configuration example of the information providing system according to the first embodiment.

As illustrated in FIG. 2, an information providing system 1 includes a plurality of wireless terminals $2_1$ to $2_n$, a plurality of wireless LAN access points $3_1$ to $3_n$, and an information providing apparatus 4, and provides the wireless terminals $2_1$ to $2_n$ with various types of information through a path selected from the information providing apparatus 4.

The wireless terminals $2_1$ to $2_n$ are mobile phone devices including a wireless LAN communication function like a smart phone, and are owned by respective users. Note that, when it is not necessary to distinguish the wireless terminals $2_1$ to $2_n$, the wireless terminals $2_1$ to $2_n$ are collectively written as "wireless terminal 2".

The wireless LAN access points $3_1$ to $3_n$ and the information providing apparatus 4 are managed by, for example, an information delivery service provider. Note that, when it is not necessary to distinguish the wireless LAN access points $3_1$ to $3_n$, the wireless LAN access points $3_1$ to $3_n$ are collectively written as "wireless LAN access point 3".

The wireless LAN access point 3 is connected with the information providing apparatus 4 through a communication network 5, and the information providing apparatus 4 can provide the wireless terminal 2 with various types of information from the wireless LAN access point 3 through the communication network 5. In the present embodiment, description will be given in which the communication network 5 is the Internet. However, the communication network 5 is not limited to the Internet, and may be a network exclusively provided for the information delivery service provider, for example.

Further, a mobile phone communication network 6 is connected to the communication network 5 through gateway servers 8 and 9, and the information providing apparatus 4 can cause mobile phone base stations 7₁ to 7ₙ connected to the mobile phone communication network 6 to transmit information to the wireless terminal 2 through the communication network 5. Note that, when it is not necessary to distinguish the mobile phone base stations 7₁ to 7ₙ, the mobile phone base stations 7₁ to 7ₙ are collectively written as "mobile phone base station 7".

Here, the mobile phone communication network 6 has been exemplarily described as the communication network to which the wireless WAN base station is connected. However, the communication network to which the wireless WAN base station is connected is not limited to the mobile phone communication network 6. For example, the communication network to which the wireless WAN base station is connected may be a data communication private network. In this case, the wireless WAN base station is a wireless base station of the data communication private network, and information is transmitted from the wireless base station to the wireless terminal 2.

Hereinafter, specific configurations of the wireless terminal 2, the wireless LAN access point 3, and the information providing apparatus 4 will be respectively described in that order.

1.4. Wireless Terminal 2

FIG. 3 is a diagram illustrating a specific configuration example of the wireless terminal 2. As illustrated in FIG. 3, the wireless terminal 2 includes a wireless LAN communication unit 20, a wireless WAN communication unit 21, a display unit 22, an operation unit 23, a storage unit 24, and a control unit 25.

The wireless LAN communication unit 20 transmits/receive information to/from the wireless LAN access point 3. The wireless LAN communication unit 20 also has a function to detect the radio wave intensity of the wireless signal transmitted from the wireless LAN access point 3 and outputs the radio wave intensity to the control unit 25. Note that an example of the wireless LAN includes a wireless LAN specified by IEEE 802.11. However the wireless LAN is not limited to the wireless LAN of the standard.

The wireless WAN communication unit 21 transmits/receives information to/from the mobile phone base station 7. The mobile phone base station 7 is a wireless base station of a public phone communication network or a wireless base station of a public data communication network, for example.

The display unit 22 is a touch panel-type display. The user of the wireless terminal 2 can operate the operation screen of the information notification app displayed in the display unit 22 by operating a surface of a screen of the display unit 22 by a finger or the like. The display unit 22 is, for example, a small liquid crystal display (LCD) or an organic EL display. Note that the display unit 22 has been exemplarily illustrated as an example of the indication unit. However, as described above, the notification information may be the sound information, the vibration information, or the like. In this case, the sound output unit that outputs a sound based on the sound information is an example of the indication unit, and the vibration output unit that vibrates based on the vibration information is an example of the indication unit.

The operation unit 23 includes keyboards including a key, an enter key, and an arrow key for inputting a letter, a number, and a space, a power button, and the like.

The storage unit 24 is, for example, a random access memory (RAM), a semiconductor memory device such as a flash memory, or a storage device such as a hard disk or an optical disk. The storage unit 24 stores various programs, setting data, and the like. Examples of the programs stored in the storage unit 24 include, for example, programs of an operating system (OS) and of information notification application (hereinafter, information notification app). The control unit 25 of the wireless terminal 2 acquires, for example, program data of the information notification app through the communication network 5, and stores the program data in the storage unit 24.

The control unit 25 is realized, for example, by an integrated circuit such as an application specific integrated circuit (ASIC) or a field programmable gate array (FPGA). Further, the control unit 25 realizes or executes a function or an action of information processing described below by the program stored in the storage unit 24 being executed by a central processing unit (CPU) or a micro processing unit (MPU) using an internal RAM (not illustrated) as a work area.

The control unit 25 functions as an information management unit 51 and a display control unit 52 by executing the information notification app in which the program data is stored in the storage unit 24. Further, the control unit 25 stores an initial value of the setting data of the information notification app, an AP information table, and a notification AP information table in the storage unit 24 by executing the information notification app, the program data of which is stored in the storage unit 24, for example.

Note that the configuration of the control unit 25 is not limited to the above configuration, and may be any configuration as long as the configuration performs information processing described below. Further, the function of the information notification app can be set to the control unit 25, in advance.

1.4.1. Information Management Unit 51

The information management unit 51 acquires the information on the wireless LAN access point 3 (hereinafter, described as AP detection information) for the wireless LAN communication unit 20 with a predetermined period (for example, every one second), and stores the acquired information in the storage unit 24. This enables acquisition history of the AP detection information to be stored in the storage unit 24.

FIG. 4 is a diagram illustrating a configuration of the AP detection information. As illustrated in FIG. 4, the AP detection information includes information on an "AP-LID", the "radio wave intensity" and a "detected time".

The "AP-LID" is a media access control address (MAC address) of a wireless LAN communication unit 30 of the wireless LAN access point 3, for example, and is included in the wireless signal (hereinafter, described as AP wireless signal) transmitted from the wireless LAN access point 3. Note that any information other than the MAC address of the wireless LAN communication unit 30 can be employed as long as the wireless LAN access point 3 can be identified with the information.

The "radio wave intensity" is information on radio wave intensity of the AP wireless signal. Here, the radio wave intensity of the AP wireless signal is an intensity level, in which a value becomes larger as the intensity becomes higher within a range of 0 to 10. However, the radio wave intensity can be set by another unit (for example, dBm).

The "detected time" is a time at which the wireless LAN communication unit 20 detects the radio wave intensity of the AP wireless signal. Note that, when not being able to acquire information on the detected time from the wireless LAN communication unit 20, the information management unit 51 stores a time at which the information management unit 51 has acquired the information on the radio wave intensity of the AP wireless signal or the like from the wireless LAN communication unit 20 in the storage unit 24 as the AP detection information in place of the "detected time".

As described above, the information management unit 51 acquires and stores the AP detection information related to the AP communication area that the wireless terminal 2 has entered in the storage unit 24, and determines a wireless LAN access point 3 to serve as the notification acquisition object on the basis of the AP detection information.

To be specific, the information management unit 51 obtains, as AP unit information, average radio wave intensity, an average stay time, and the number of entrance for each wireless LAN access point 3 of the AP communication area that the wireless terminal 2 has entered on the basis of the AP detection information stored in the storage unit 24. The information management unit 51 then sets the AP unit information to the AP information table stored in the storage unit 24.

FIG. 5 is a diagram illustrating an example of the AP information table. As illustrated in FIG. 5, the AP information table is AP unit information in which the "average radio wave intensity", the "average stay time", and the "the number of entrance" are associated with each other for each "AP-LID". The "AP-LID" is the same as the above-described "AP-LID" of the AP detection information.

The "average radio wave intensity" is an average value of the radio wave intensity of the AP wireless signal received in the AP communication are that the wireless terminal 2 has entered, and the information management unit 51 obtains the average radio wave intensity on the basis of the radio wave intensity of the AP wireless signal received in the wireless LAN communication unit 20 during a predetermined term Ta.

The "average stay time" is an average value of the stay time in the AP communication area that the wireless terminal 2 has entered, and the information management unit 51 obtains the average stay time on the basis of a "detected time" or an "acquired time" output from the wireless LAN communication unit 20 during the predetermined term Ta. For example, when the "detected time" is continued in the AP detection information of the same "AP-LID", the information management unit 51 determines that the wireless terminal 2 is in a staying state in the AP communication area, and determines a term until the "detected time" become discontinued as a "stay time", and an average value of the "stay time" as the "average stay time".

The "the number of entrance" is the number of entrance of the wireless terminal 2 to the AP communication area, and when the "detected time" is continued for a predetermined time or more in the AP detection information of the same "AP-LID", the information management unit 51 determines that the wireless terminal 2 is in a staying state in the AP communication area, and increments the "the number of entrance".

In the AP information table illustrated in FIG. 5, for example, in the AP communication area of an AP-LID "A1", the average value of the radio wave intensity of the AP wireless signal received by the wireless terminal 2 is "10", the average value of the stay time of the wireless terminal 2 is "30 seconds", and the number of entrance is "once".

Note that the above-described predetermined term Ta can be set by the user through the setting screen of the information notification app. The setting screen of the information notification app is displayed, by the display control unit 52, in the display unit 22 on the basis of the setting data stored in the storage unit 24, and in a display state, the setting data of the storage unit 24 can be updated according to operation details by a user operation to the display unit 22 or the operation unit 23.

Further, while the user of the wireless terminal 2 can set the value of the predetermined term Ta through the setting screen of the information notification app as described above, the user can select an automatic mode in which the value of the predetermined term Ta is automatically set. In the automatic mode, the information management unit 51 uses a term until a predetermined condition is satisfied as the predetermined term Ta.

As the predetermined condition, the number of pieces of AP detection information newly stored in the storage unit 24, the number of AP-LIDs included in the AP detection information newly stored in the storage unit 24, or a combination thereof. For example, the information management unit 51 can set the predetermined term Ta subject to a predetermined condition that the number of pieces of the AP detection information newly stored in the storage unit 24 is a predetermined number or more, and the number of the AP-LIDs included in the AP detection information newly stored in the storage unit 24 is a predetermined number or more.

When the user manually sets the predetermined term Ta, for example, a term from a present time to a predetermined time in the past can be employed as the predetermined term Ta (for example, from the present to five hours ago, one day ago, one week ago, one month ago, or the like).

As described above, the information management unit 51 obtains the average radio wave intensity, the average stay time, and the number of entrance in units of AP communication area that the wireless terminal 2 has entered, and determines a wireless LAN access point 3 to serve as the notification acquisition object on the basis of the information.

The information management unit 51 has a first determination mode and a second determination mode as modes to determine the notification acquisition object, and whether which mode is used to determine the notification acquisition object can be set by the user through the setting screen of the information notification app, similarly to the predetermined term Ta.

First, the first determination mode will be described. When the first determination mode is set, the information management unit 51 determines, as the notification acquisition object, a wireless LAN access point 3 falling within the predetermined higher rank K1 in the ranking determined on the basis of the information on the radio wave intensity of the wireless LAN access point 3.

To be specific, the information management unit 51 extracts the AP-LIDs in order from an AP-LID having the highest intensity from among average radio wave intensities set to the AP information table, and determines, as the notification acquisition object, a wireless LAN access point 3 corresponding to an AP-LID falling within the predetermined higher rank K1 in the ranking.

In the processing, the information management unit 51 determines, as a LAN notification acquisition object, a wireless LAN access point 3 falling within the predetermined highest rank K2 (<K1) in the ranking determined based on the radio wave intensity of the AP wireless signal. Further, the information management unit 51 determines, as a WAN notification acquisition object, a wireless LAN access point 3 that is in the predetermined higher rank K1 or more, and in less than the predetermined highest rank K2 in the ranking determined on the basis of the radio wave intensity of the AP wireless signal.

The information management unit 51 sets a determination result in the notification AP information table of the storage unit 24. FIG. 6 is a diagram illustrating an example of the notification AP information table. As illustrated in FIG. 6, the notification AP information table is information in which a "rank", an "AP-LID", and a "communication medium" are associated with each other.

The "rank" is an rank determined on the basis of the radio wave intensity of the AP wireless signal (hereinafter, described as AP rank), and the information management unit 51 causes the wireless LAN access point 3 having higher average radio wave intensity to be in a higher rank. Note that the AP rank can be determined in consideration of not only the average radio wave intensity but also the average stay time.

For example, the information management unit 51 can cause a wireless LAN access point 3, which obtains a larger result as a result of weighting performed with respect to the average radio wave intensity according to the average stay time, to be in a higher rank. Further, the information management unit 51 can also cause a wireless LAN access point 3, which obtains a larger result as a result of weighting performed with respect to the average radio wave intensity according to the average stay time and the number of entrance, to be in a higher rank.

The second determination mode will be described. When the second determination mode is set, the information management unit 51 determines a wireless LAN access point 3 corresponding to the AP unit information that satisfies a condition set by the user of the wireless terminal 2 (hereinafter, described as notification object condition) from among pieces of AP unit information set to the AP information table as the notification acquisition object.

The notification object condition can be set by the user of the wireless terminal 2 through the setting screen of the information notification app, similarly to the predetermined term Ta. Information on the notification object condition set by the user of the wireless terminal 2 is stored in the storage unit 24. The information management unit 51 determines the notification acquisition object on the basis of the information on the notification object condition stored in the storage unit 24.

As the notification object condition, one lower limit value or two or more lower limit values of the average radio wave intensity, the average stay time, and the number of entrance can be set. For example, when the lower limit value of the average radio wave intensity is "3", and the lower limit value of the average stay time is "20 seconds", the information management unit 51 determines a wireless LAN access point 3 corresponding to the AP unit information including the average radio wave intensity of "3" or more and the average stay time of "20 seconds" or more to be the notification acquisition object.

Note that the determination of the notification acquisition object can be performed in synchronization with an update of the AP information table, for example, and the timing can be set by the user of the wireless terminal 2 through the setting screen of the information notification app, similarly to the notification object condition. Further, a "determination timing update button" is provided on the setting screen of the information notification app, and when the "determination timing update button" is selected by the user of the wireless terminal 2, the information management unit 51 can start the processing of determining the notification acquisition object.

When having determined the notification acquisition object as described above, the information management unit 51 transmits information on the notification acquisition object to the information providing apparatus 4 through the wireless LAN communication unit 20 or the wireless WAN communication unit 21. Note that, when having entered the wireless LAN access point 3 to serve as the notification acquisition object, the information management unit 51 can transmit the information on the notification acquisition object to the information providing apparatus 4 through the wireless LAN access point 3.

1.4.2. Display Control Unit 52

Next, the display control unit 52 will be described. The display control unit 52 displays the notification information transmitted from the information providing apparatus 4 and received by the wireless LAN communication unit 20 or the wireless WAN communication unit 21 in the display unit 22.

FIG. 7A is a diagram illustrating a screen example in which the LAN notification information notified through the wireless LAN access point 3 is displayed in the display unit 22 of the wireless terminal 2. The LAN notification information is, for example, digital contents related to the AP installation location and contents such as a shopping page, and is information having a relatively large information amount.

A communication speed of communication through the wireless LAN access point 3 is sometimes relatively fast. Therefore, even if the notification information is information having a relatively large information amount, the notification information can be acquired by the wireless terminal 2 at a high speed. Therefore, the notification information can be notified to the wireless terminal 2 at an appropriate timing. Further, a communication charge of the communication through the wireless LAN access point 3 is often low or zero, and a charge burden of the user of the wireless terminal 2 is low.

FIG. 7B is a diagram illustrating a screen example in which the WAN notification information notified through the mobile phone base station 7 is displayed in the display unit 22 of the wireless terminal 2. The WAN notification information is simple information corresponding to the AP installation location, for example, and is information having a relatively small information amount. In the example illustrated in FIG. 7B, information indicating a microwave sold in a store of the AP installation location is at a special bargain price is displayed in the display unit 22 of the wireless terminal 2 as the notification information.

The communication speed of the communication through the mobile phone base station 7 is often relatively slow. Therefore, by using the information having a relatively small information amount as the notification information, the notification information can be acquired by the wireless terminal 2 at a high speed, and the notification information can be notified to the wireless terminal 2 at an appropriate timing. The communication charge of the communication through the mobile phone base station 7 is relatively high, and a use upper limit is often determined. Therefore, a user burden of the user of the wireless terminal 2 can be reduced.

Note that the display control unit 52 performs other display control necessary in the information notification app. For example, the display control unit 52 displays the setting screen of the information notification app in the display unit 22 on the basis of layout data of the setting screen of the information notification app and the setting data stored in the storage unit 24.

Further, the display control unit 52 can notify the acquisition of the notification information from the indication unit. For example, the display control unit 52 can notify the acquisition of the notification information by an output of a sound from a sound output unit (not illustrated), by an output of a vibration from a vibration output unit (not illustrated), or by outputs of both of the sound/vibration from the sound output unit and the vibration output unit.

1.5. Configuration of Wireless LAN Access Point 3

First, a configuration of the wireless LAN access point 3 will be specifically described. As illustrated in FIG. 2, the wireless LAN access point 3 includes a wireless LAN communication unit 30, a communication unit 31, and a control unit 32.

The wireless LAN communication unit 30 is installed such that an area including a location to serve as an object can be the communication area. The wireless LAN communication unit 30 is a communication interface that performs wireless LAN communication, and transmits/receives information by wireless signals to/from the wireless terminal 2 equipped with a wireless LAN communication function.

The communication unit 31 is connected to the communication network 5, and transmits/receives information to/from the information providing apparatus 4 and a web site (not illustrated) through the communication network 5. The communication unit 31 is connected to the communication network 5 in a wired or wireless manner. Hereinafter, a device such as the information providing apparatus 4 or a web server (not illustrated) connected to the communication network 5 is described as a communication network-side device.

The control unit 32 includes a relay unit 35 that performs information relay processing and a detection unit 36 that performs detection processing of the wireless terminal 2, and realizes or executes a function or an action of the information processing described below. Note that the internal configuration of the control unit 32 is not limited to the configuration, and may be another configuration as long as the configuration performs the information processing described below.

1.5.1. Relay Unit 35

The relay unit 35 transmits information acquired from the wireless terminal 2 through the wireless LAN communication unit 30 to the communication network-side device from the communication unit 31, and transmits information acquired from the communication network-side device through the communication unit 31 to the wireless terminal 2 from the wireless LAN communication unit 30.

Note that the information transmission from the wireless LAN access point 3 to the communication network-side device is performed, for example, by packet communication in which an address of the communication network 5 to be allocated to the wireless LAN access point 3 is a transmission source address, and an address of the communication network 5 to be allocated to the communication network-side device is a transmission destination address. The address of the communication network 5 is, for example, an address to be allocated to the communication unit 31, and is, for example, an IP address.

1.5.2. Detection Unit 36

Figure 8A:
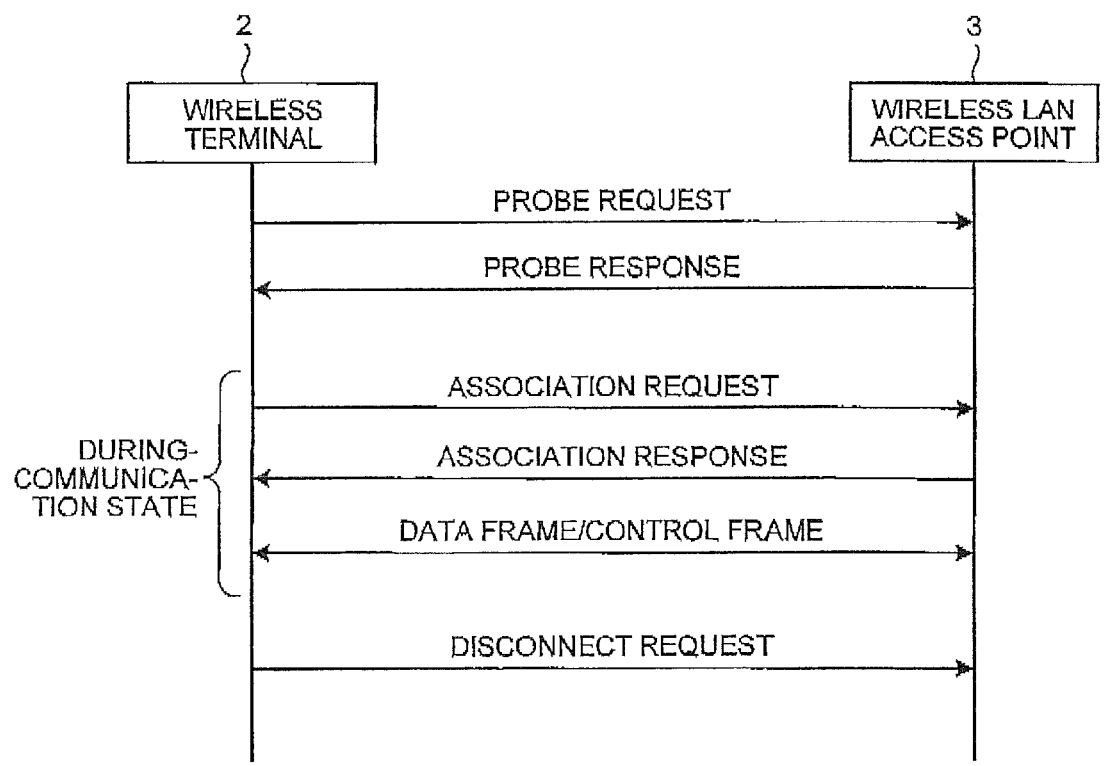
FIGS. 8A and 8B are diagrams illustrating sequences of establishing a session between a wireless LAN access point and a wireless terminal.
Figure 8B:
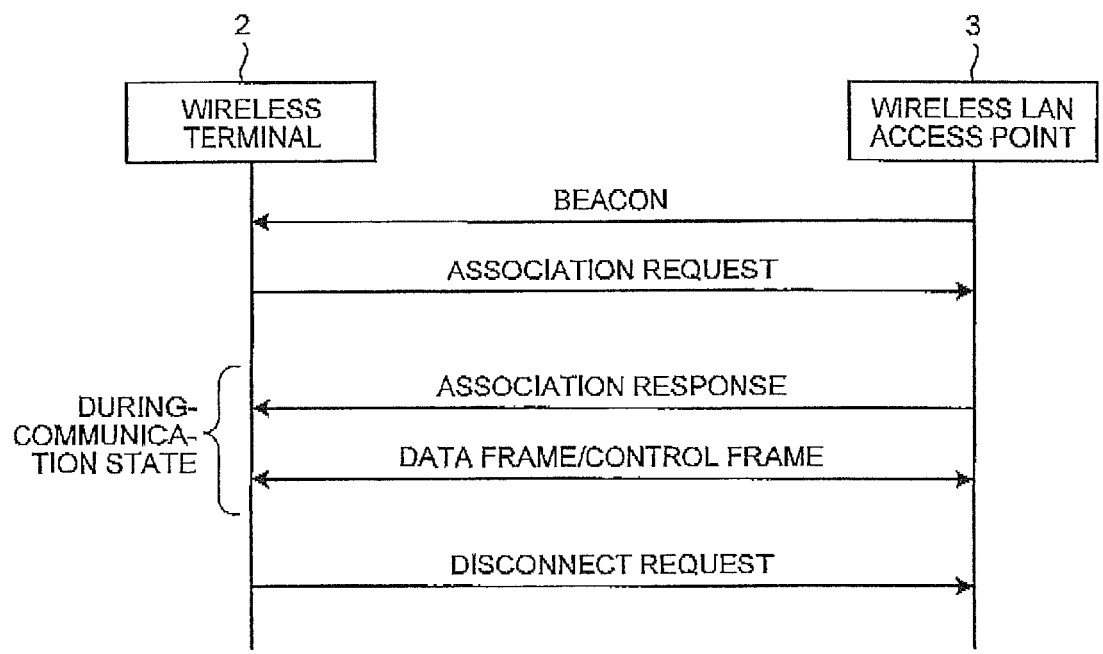

The detection unit 36 acquires a wireless packet transmitted from the wireless terminal 2 through the wireless LAN communication unit 30 to detect existence of the wireless terminal 2. FIGS. 8A and 8B are diagrams illustrating sequences of establishing a session between the wireless LAN access point 3 and the wireless terminal 2.

In the example illustrated in FIG. 8A, a wireless packet called probe request is periodically transmitted from the wireless terminal 2 by broadcast or the like, and the detection unit 36 acquires the wireless packet through the wireless LAN communication unit 30 to detect the existence of the wireless terminal 2.

The probe request includes a basic service set identifier (BSSID), and when the BSSID coincides with a BSSID of the wireless LAN communication unit 30, the detection unit 36 transmits a probe response to the wireless terminal 2. The wireless terminal 2 that has received the probe response transfers to a during-communication state in a case where automatic communication is set.

The transfer to the during-communication state is performed, as illustrated in FIG. 8A, by establishment of a session by an association request and an association response, and following that, the wireless terminal 2 and the wireless LAN communication unit 30 transmit/receive a data frame and a control frame each other to enter the during-communication state.

Further, the detection unit 36 broadcasts a wireless packet called beacon to the wireless terminal 2 to which the wireless packet is not periodically transmitted, through the wireless LAN communication unit 30 as illustrated in FIG. 8B, and receives an association request with respect to the beacon to detect the existence of the wireless terminal 2. The detection unit 36 that has received the association request transmits an association response to the wireless terminal 2 to establish a session, and causes the wireless terminal 2 and the wireless LAN communication unit 30 to be in the during-communication state.

When having transferred to the during-communication state, the detection unit 36 repeatedly receives a wireless packet until the during-communication state is cancelled and detects the existence of the wireless terminal 2. Note that the during-communication state is cancelled when a disconnect request is given from the wireless terminal 2 or when the wireless packet cannot be transmitted/received between the wireless terminal 2 and the wireless LAN communication unit 30.

When having determined to have detected the wireless terminal 2, for example, the detection unit 36 transmits terminal information of the wireless terminal 2 to the information providing apparatus 4 through the communication unit 31. To be specific, the detection unit 36 extracts a terminal ID included in the wireless packet transmitted from the wireless terminal 2, and detects radio wave intensity.

The terminal ID is, for example, a MAC address of the wireless LAN communication unit 20 of the wireless terminal 2, and is added to the wireless packet and transmitted from the wireless terminal 2. The radio wave intensity is radio wave intensity of a wireless signal received by the wireless LAN access point 3.

The detection unit 36 transmits an AP-WID and information on whether being in the during-communication state in addition to the terminal ID of the wireless terminal 2 and information on the radio wave intensity to the information providing apparatus 4 as the terminal information. As the AP-WID, for example, a network address of the communication network 5 to be allocated to the communication unit 31 can be used.

1.6. Configuration of Information Providing Apparatus 4

Next, a specific configuration of the information providing apparatus 4 according to the embodiment will be described. As illustrated in FIG. 2, the information providing apparatus 4 includes a communication unit 40, a storage unit 41, and a control unit 42. Further, the storage unit 41 includes a user information DB 43 and a location information DB 44, and the control unit 42 includes an acquisition unit 45, a determination unit 46, a transmission unit 47, and an information providing unit 48.

The communication unit 40 is an interface such as a network interface card (NIC). The control unit 42 transmits/receives various types of information to/from the wireless LAN access point 3 through the communication unit 40 and the communication network 5, and to/from the wireless terminal 2 through the wireless LAN access point 3.

The user information DB 43 and the location information DB 44 are storage devices such as a hard disk, a RAM, a semiconductor memory device such as a flash memory, or an optical disk. Note that the user information DB 43 and the location information DB 44 may be a single DB. Note that the various IDs stored in the user information DB 43 and the location information DB 44 are described using the reference signs "A1" and "U1". These reference signs are denoted in order to distinguish the IDs for convenience of description, and are not given for the purpose of limiting the IDs.

The control unit 42 is realized, for example, by an integrated circuit such as an ASIC or a FPGA. Further, the control unit 42 functions as the acquisition unit 45, the determination unit 46, the transmission unit 47, and the information providing unit 48 by a program stored in the internal storage device being executed by a CPU or a MPU using a RAM as a work area. Note that the configuration of the control unit 42 is not limited to the configuration, and may be another configuration as long as the configuration performs information processing described below.

1.6.1. Acquisition Unit 45

The acquisition unit 45 acquires the information transmitted from the wireless LAN access point 3. The information transmitted from the wireless LAN access point 3 includes, for example, the terminal information, as described above. When having acquired the terminal information transmitted from the wireless LAN access point 3, the acquisition unit 45 updates the terminal information table of the location information DB 44 on the basis of the information included in the terminal information.

FIG. 9 is a diagram illustrating an example of the terminal information table. As illustrated in FIG. 9, the AP terminal information table is information in which a "terminal ID", a "check-in time", a "check-out time" and "radio wave intensity" are associated with each other for each "AP-WID".

The "AP-WID" is identification information of the wireless LAN access point 3, and is information to be allocated to each wireless LAN access point 3. The "AP-WID" is, for example, a network address of the communication network 5 to be allocated to the communication unit 31 of the wireless LAN access point 3.

The "terminal ID" is a terminal ID of the wireless terminal 2 existing in the AP communication area of the associated wireless LAN access point 3. For example, the example of FIG. 9 illustrates wireless terminals $2_1$ to $2_4$ of terminal IDs "T1" to "T4" and the like exist in the AP communication area of the wireless LAN access point 3, of the AP-WID "AW1".

The "radio wave intensity" is information on the radio wave intensity of the wireless terminal 2 existing in the AP communication area. The example in FIG. 9 illustrates information on latest radio wave intensity corresponding to each terminal ID for the purpose of convenience. However, information on the radio wave intensity from when the wireless terminal 2 entered the AP communication area and an average value thereof are set to the terminal information table. Further, the example of FIG. 9 illustrates the radio wave intensity by an intensity level, similarly to FIG. 5, in which a value becomes larger as the intensity becomes higher within a range of 0 to 10. However, the radio wave intensity can be set by another unit (for example, dBm).

When having received the terminal information including the information on being in the during-communication state from the wireless LAN access point 3, the acquisition unit 45 sets the terminal ID and the information on the radio wave intensity included in the detection information to the terminal existence data in association with the "AP-WID" included in the terminal information. Further, the acquisition unit 45 sets a time, at which the wireless terminal 2 has entered the during-communication state, to the terminal information table as a "check-in time".

A stay time of the wireless terminal 2 in the AP communication area can be detected by comparison of the check-in time and a current time. Note that the acquisition unit 45 can set a time, at which reception of the terminal information is started, to the terminal information table as an "enter time" independently of whether being in the during-communication state.

When the wireless terminal 2, the information on which has been set to the terminal information table, exits from the AP communication area afterwards, the acquisition unit 45 sets the exit time of the wireless terminal 2 to the terminal information table as a "check-out time".

Further, when having acquired the information on the notification acquisition object from the wireless terminal 2, the acquisition unit 45 sets the information on the notification acquisition object to a user information table described below.

1.6.2. Determination Unit 46

The determination unit 46 determines whether either communication medium of the wireless LAN access point 3 or the mobile phone base station 7 is used to notify the notification information on the basis of the terminal information table and the user information table.

To be specific, the determination unit 46 determines whether there is a wireless terminal 2 having newly entered the AP communication area (hereinafter, may be described as newly entering terminal) on the basis of the terminal information table. For example, the determination unit 46 determines a wireless terminal 2 in which a new "check-in time" is set to the terminal information table as the newly entering terminal.

Note that the determination unit 46 can determine a wireless terminal 2 in which a new "check-in time" is set to the terminal information table, and the stay time is a predetermined time as the newly entering terminal. Further, the determination unit 46 can determine a wireless terminal 2 in which a new "check-in time" is set to the terminal information table, the stay time passes a predetermined time, and the radio wave intensity has a predetermined value or more as the newly entering terminal.

When there is a newly entering terminal, the determination unit 46 determined whether notifying the notification information on the basis of the user information table stored in the user information DB 43. The AP-LID of the wireless LAN access point 3 of the notification acquisition object is set to the user information table as the notification object AP. When an AP-LID corresponding to the newly entering terminal is set to the user information table, the determination unit 46 determines to notify the notification information, and when the AP-LID corresponding to the newly entering terminal is not set to the user information table, the determination unit 46 determines not to notify the notification information.

FIG. 10 is a diagram illustrating an example of the user information table. As illustrated in FIG. 10, the user information table is information in which information such as a "terminal ID", a "WAN-ID", and a "notification object AP" are associated with each other for each "user ID". The "terminal ID" and the "WAN-ID" are, for example, information included in a registration request from the wireless terminal 2 to the information providing apparatus 4, and the like, and are set to the user information table by the acquisition unit 45 when the wireless terminal 2 performs user registration to the information providing apparatus 4.

The "user ID" is an ID allocated to each user of the wireless terminal 2, and is set to the user information table by the acquisition unit 45 when the wireless terminal 2 performs user registration to the information providing apparatus 4, for example.

The "terminal ID" is identification information of the wireless terminal 2 at a wireless LAN communication unit 20 side, and is a MAC address allocated to the wireless LAN communication unit 20 of the wireless terminal 2, for example. In this case, the wireless terminal 2 transmits/receives a wireless packet including the terminal ID to perform communication with the wireless LAN access point 3. Note that the terminal ID may just be able to identify the wireless terminal 2, and is not necessarily limited to the MAC address.

The "WAN-ID" is identification information of the wireless terminal 2 at a mobile phone communication unit side. For example, when the wireless terminal 2 is a third generation mobile communication system, the WAN-ID is a unique number of a subscriber identity module card (SIM card) incorporated in the wireless terminal 2. The unique number is also called international mobile subscriber identity (IMSI). The wireless terminal 2 transmits/receives a wireless packet including the WAN-ID to perform communication with the mobile phone base station 7.

The "notification object AP" is an AP-LID of the wireless LAN access point 3 specified as the notification acquisition object from the wireless terminal 2. The notification object AP includes a LAN notification object AP and a WAN notification object AP. The notification object AP is set to the user information table by the acquisition unit 45 when the information on the notification acquisition object is transmitted from the wireless terminal 2 to the information providing apparatus 4.

When the AP-LID corresponding to the newly entering terminal is set to the user information table, the determination unit 46 determines to notify the notification information. The notification information is notified from a communication medium of either the wireless LAN access point 3 or the mobile phone base station 7 (hereinafter, may be described as notification communication medium).

When the AP-LID corresponding to the newly entering terminal is set as the LAN notification object AP, the determination unit 46 determines the notification communication medium is the wireless LAN access point 3. Meanwhile, when the AP-LID corresponding to the newly entering terminal is set as the WAN notification object AP, the determination unit 46 determines the notification communication medium is the mobile phone base station 7.

1.6.3. Transmission Unit 47

The transmission unit 47 causes the notification communication medium determined by the determination unit 46 to notify the newly entering terminal identified by the terminal information of the notification information of the location information table stored in the location information DB 44.

The transmission unit 47 acquires the notification information corresponding to the notification communication medium from the location information table stored in the location information DB 44, transmits the notification information to a destination based on the user information table stored in the user information DB 43, and causes the notification communication medium to notify the newly entering terminal of the notification information.

FIG. 11 is a diagram illustrating an example of the location information table. As illustrated in FIG. 11, the location information table includes information in which information such as a "location name", "LAN notification information", "WAN notification information", and "location information" are associated with each other for each "AP-LID" and "AP-WID".

The "AP-LID" is information similar to the "AP-LID" set to the AP information table, and the "AP-WID" is information similar to the "AP-WID" set to the terminal information table. Further, the "location name" is a name of an AP installation location, and for example, the "location name" is an "A store" in the AP-LID "AL1".

The "LAN notification information" is information indicating a file name of the notification information to be notified to the wireless terminal 2 through the wireless LAN access point 3, and is stored in the location information DB 44. Further, the "WAN notification information" is information indicating a file name of the notification information to be notified to the wireless terminal 2 through the mobile phone base station 7, and is stored in the location information DB 44.

In the location information table illustrated in FIG. 11, for example, the "LAN notification information" of the AP-LID "AL1" is a file name "noticeA11.data", and the "WAN notification information" is a file name "noticeA12.data".

When the notification communication medium is the wireless LAN access point 3, the transmission unit 47 acquires the LAN notification information set to the location information table, and transmits the LAN notification information to the wireless LAN access point 3 using the terminal ID set to the user information table as the destination for the newly entering terminal. Accordingly, the WAN notification information is notified from the wireless LAN access point 3 to the newly entering terminal.

Further, when the notification communication medium is the mobile phone base station 7, the transmission unit 47 acquires the WAN notification information set to the location information table, and transmits the WAN notification information to the mobile phone communication network 6 through the communication network 5 using the WAN-ID set to the user information table for the newly entering terminal. Accordingly, the LAN notification information is notified from the mobile phone base station 7 to the newly entering terminal.

1-6-4. Information Providing Unit 48

When an information distribution request is given from the wireless terminal 2 through the wireless LAN access point 3, the information providing unit 48 transmits the information corresponding to the information distribution request to the wireless terminal 2 as a requestor through the wireless LAN access point 3.

The information corresponding to the information distribution request is stored in the location information DB 44 for each AP-WID, and the information providing unit 48 acquires the information from the location information DB 44 and transmits the information to the wireless terminal 2 on the basis of the AP-WID of the wireless LAN access point 3 that has transferred the information distribution request.

For example, when the display unit 22 of the wireless terminal 2 is a touch panel display, the notification information displayed in the display unit 22 of the wireless terminal 2 illustrated in FIGS. 7A and 7B is selected by the user of the wireless terminal 2, so that the information distribution request is transmitted from the wireless terminal 2.

1.7. Processing Flow of Information Providing System 1

Next, a procedure of information delivery processing by the information providing system 1 according to the embodiment will be described. FIGS. 12 to 15 are diagrams for describing information delivery processing flows by the information providing system 1. Hereinafter, processing of the wireless terminal 2 will be described with reference to FIG. 12, processing of the wireless LAN access point 3 will be described with reference to FIG. 13, and processing of the information providing apparatus 4 will be described with reference to FIGS. 14 and 15.

1.7.1. Processing Flow of Wireless Terminal 2

Figure 12:
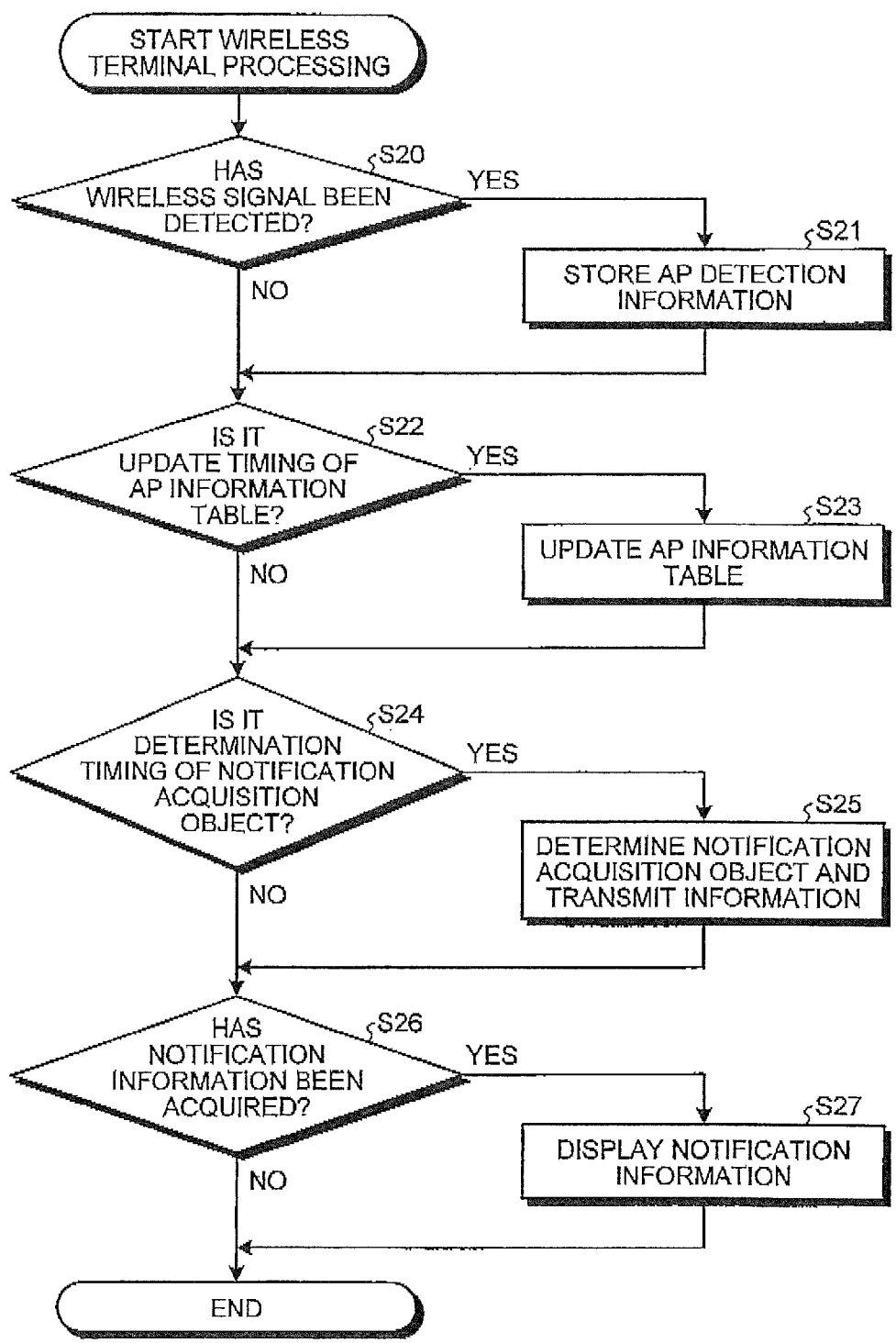
FIG. 12 is a flowchart of information processing in a wireless terminal.

First, the information processing of the wireless terminal 2 according to the embodiment will be, described with reference to FIG. 12. FIG. 12 is a flowchart of the information processing in the wireless terminal 2. The operation is processing repeatedly executed by the control unit 25 of the wireless terminal 2.

As illustrated in FIG. 12, the control unit 25 of the wireless terminal 2 determines whether having detected the AP wireless signal transmitted from the wireless LAN access point 3 through the wireless LAN communication unit 20 (step S20). In the processing, when having determined to have detected the AP wireless signal transmitted from the wireless LAN access point 3 (Yes in step S20), the control unit 25 stores the AP detection information including the information on the AP-LID, the radio wave intensity, and the detected time in the storage unit 24 (step S21).

When the processing of step S21 ends, when having determined not to have detected the AP wireless signal transmitted from the wireless LAN access point 3 in the processing of step S20 (No in step S20), the control unit 25 determines whether it is an update timing of the AP information table (step S22). When having determined it has been the update timing of the AP information table (Yes in step S22), the control unit 25 obtains the average radio wave intensity, the average stay time, and the number of entrance in units of wireless LAN access point 3 on the basis of the AP detection information stored in the storage unit 24, and updates the AP information table (step S23).

When the processing of step S23, or when having determined it has not been the update timing of the AP information table in step S22 (No in step S22), the control unit 25 determines whether it is a determination timing of the notification acquisition object (step S24). When having determined it has been the determination timing of the notification acquisition object (Yes in step S24), the control unit 25 determines a wireless LAN access point 3 to serve as the notification acquisition object on the basis of the AP information table stored in the storage unit 24, and transmits information on the notification acquisition object to the information providing apparatus 4 (step S25).

When the processing of step S25 ends, or when having determined it has not been the determination timing of the notification acquisition object in step S24 (No in step S24), the control unit 25 determines whether having acquired the notification information from the wireless LAN access point 3 or the mobile phone base station 7 (step S26). When having determined to have acquired the notification information (Yes in step S26), the control unit 25 displays the acquired notification information in the display unit 22 (step S27).

When the processing of step S27 ends, or when having determined not to have acquired the notification information in step S26 (No in step S26), the control unit 25 terminates the processing.

1.7.2. Processing Flow of Wireless LAN Access Point 3

Figure 13:
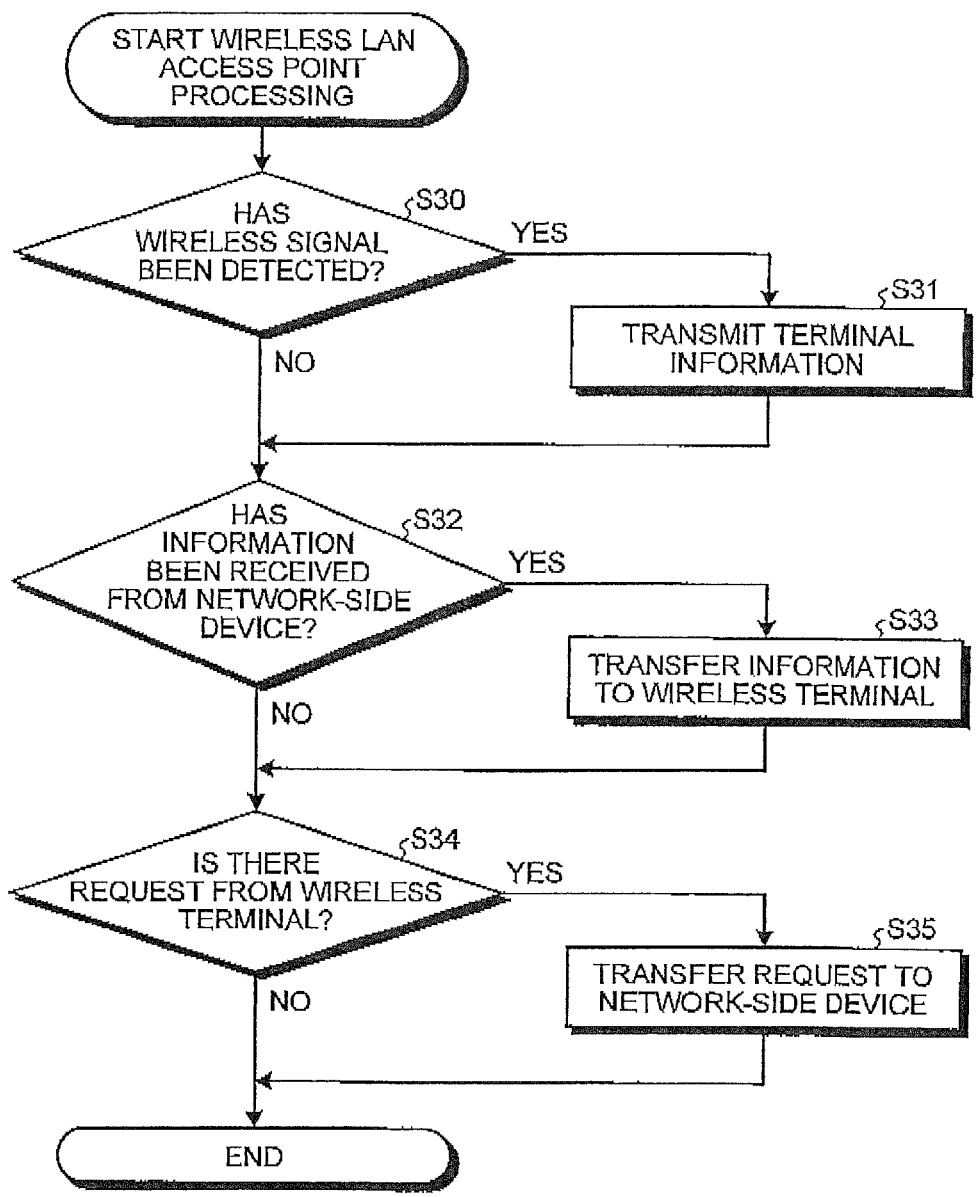
FIG. 13 is a flowchart of information processing in a wireless LAN access point.

Next, information processing of the wireless LAN access point 3 according to the embodiment will be described with reference to FIG. 13. FIG. 13 is a flowchart of information processing at the wireless LAN access point 3. The operation is processing repeatedly executed by the control unit 32 of the wireless LAN access point 3.

As illustrated in FIG. 13, the control unit 32 of the wireless LAN access point 3 determines whether having detected the wireless terminal 2 through the wireless LAN communication unit 30 (step S30). In the processing, when having determined to have detected the wireless terminal 2 (Yes in step S30), the control unit 32 transmits the terminal information, the detection information including the AP-WID, the information on being in the during-communication state, and the like to the information providing apparatus 4 through the communication unit 31 (step S31).

In the processing of step S30, when having determined not to have detected the wireless terminal 2 (No in step S30), or when the processing of step S31 ends, the control unit 32 determines whether having received the information from a device connected to the communication network 5 (hereinafter, described as network-side device) through the communication unit 31 (step S32). When having determined to have received the information from the network-side device (Yes in step S32), the control unit 32 transfers the received information to the wireless terminal 2 that is the destination of the information (step S33).

In step S32, when having determined not to have received the information (No in step S32), or the processing of step S33 ends, the control unit 32 determines whether there is a request from the wireless terminal 2 to the network-side device (step S34). When having determined that there is a request from the wireless terminal 2 to the network-side device (Yes in step S34), the control unit 32 transfers the request from the wireless terminal 2 to the network-side device to the network-side device through the communication unit 31 (step S35).

When the processing of step S35 ends, or when having determined that there is no request from the wireless terminal 2 to the network-side device in step S34 (No in step S34), the control unit 32 terminates the processing.

1.7.3. Processing Flow of Information Providing Apparatus 4

Figure 14:
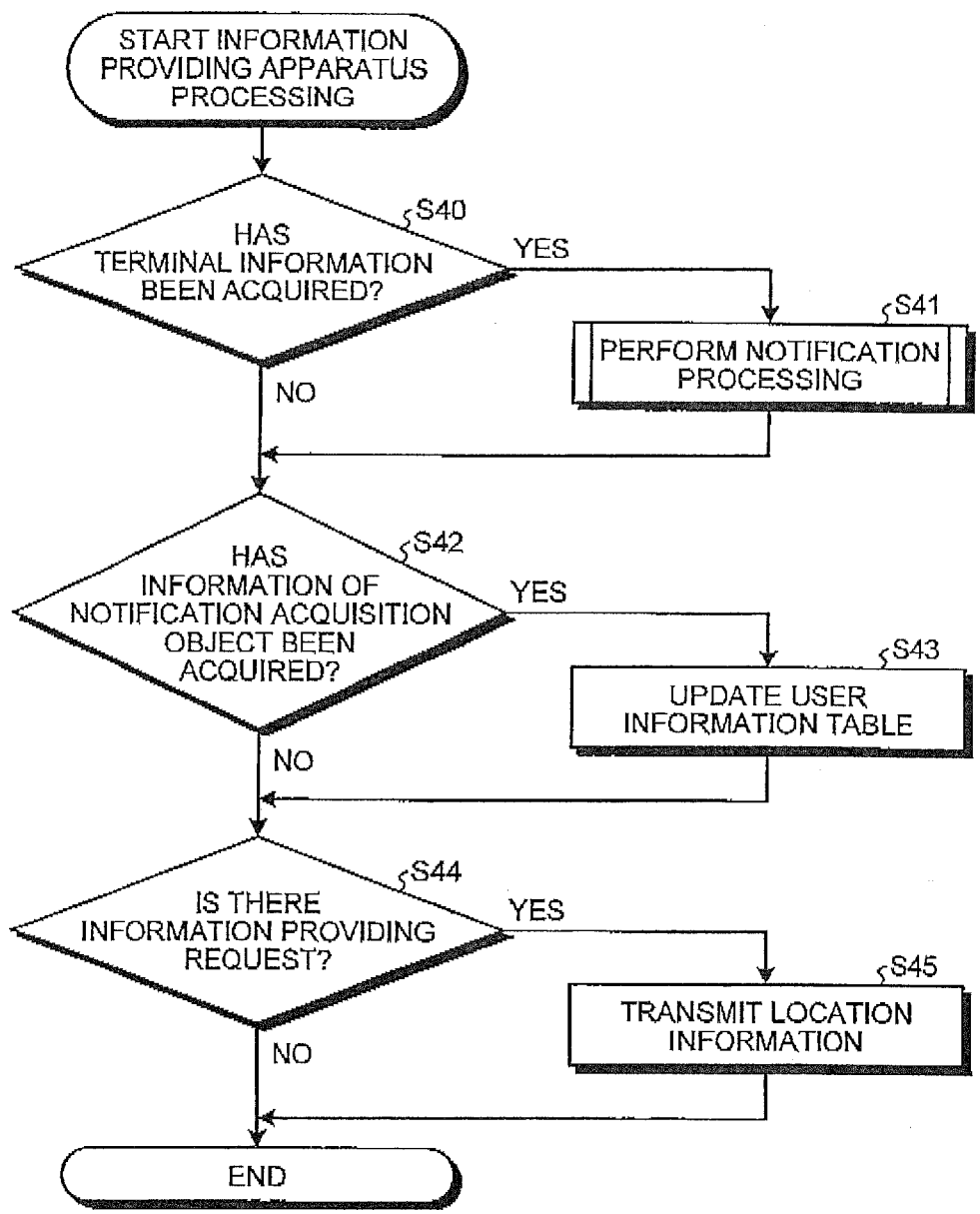
FIG. 14 is a flowchart of information processing in the information providing apparatus.

Next, processing of the information providing apparatus 4 will be described. FIG. 14 is a flowchart of information processing in the information providing apparatus 4. The operation is processing repeatedly executed by the control unit 42 of the information providing apparatus 4.

As illustrated in FIG. 14, the control unit 42 determines whether having acquired the terminal information from the wireless terminal 2 through the communication unit 40 (step S40). When having determined to have acquired the terminal information from the wireless terminal 2 (Yes in step S40), the control unit 42 performs notification processing (step S41). The notification processing is processing of steps S50 to S55 illustrated in FIG. 15, and will be described in detail below.

In step S40, when having determined not to have acquired the terminal information from the wireless terminal 2 (No in step S40), or when the processing of step S41 ends, the control unit 42 determines whether having received the information on the notification acquisition object from the wireless LAN access point 3 through the communication unit 40 (step S42). When having determined to have received the information on the notification acquisition object (Yes in step S42), the control unit 42 sets the information on the notification acquisition object to the user information table and updates the user information table (step S43).

In step S42, when having not received the information on the notification acquisition object (No in step S42), or when the processing of step S43 ends, the control unit 42 determines whether having received an information distribution request from the wireless terminal 2 through the communication unit 40 (step S44). When having received the information distribution request (Yes in step S44), the control unit 42 transmits the location information according to the information distribution request to the wireless terminal 2 as the requestor (step S45).

In step S44, when having not received the information distribution request (No in step S44), or the processing of step S45 ends, the control unit 42 terminates the processing.

Figure 15:
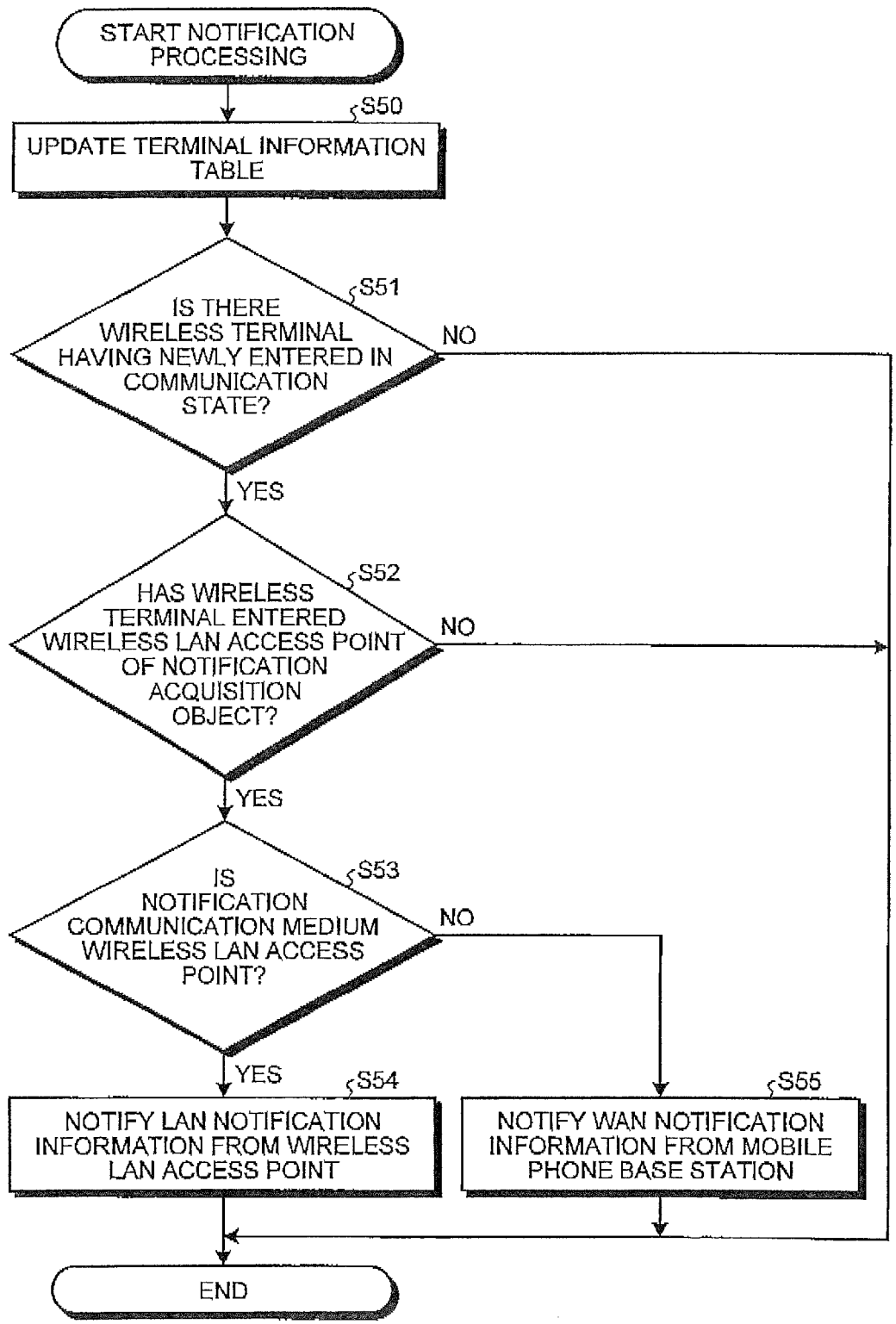
FIG. 15 is a flowchart of notification processing illustrated in FIG. 14.

Next, the notification processing in step S41 illustrated in FIG. 14 will be described. FIG. 15 is a flowchart of the notification processing in the information providing apparatus 4.

As illustrated in FIG. 15, in the notification processing, the control unit 42 updates the terminal information table on the basis of the AP-WID, the terminal ID, the radio wave intensity, and the information on whether during communication included in the acquired terminal information (step S50).

Next, the control unit 42 determines whether there is a wireless terminal 2 that has newly entered a communication state with the wireless LAN access point 3 in the AP communication area on the basis of the updated terminal information table (step S51). When having determined that there is a wireless terminal 2 having newly entered the communication state in the AP communication area (newly entering terminal) (Yes in step S51), the control unit 42 determines whether the wireless LAN access point 3 of the AP communication area that the newly entering terminal has entered is the wireless LAN access point 3 of the notification acquisition object on the basis of the user information table (step S52).

In step S52, when having determined that the newly entering terminal has entered the wireless LAN access point 3 of the notification acquisition object (Yes in step S52), the control unit 42 determines whether a transmission medium that notifies the notification information (notification communication medium) is the wireless LAN access point 3 that the newly entering terminal has entered on the basis of the information on the notification object AP of the newly entering terminal set to the user information table (step S53).

When having determined the wireless LAN access point 3 as the notification communication medium (Yes in step S53), the control unit 42 acquires the LAN notification information set to the location information table, and transmits the LAN notification information to the wireless LAN access point 3 using the terminal ID set to the user information table as the destination for the newly entering terminal (step S54).

Meanwhile, when having determined the mobile phone base station 7 an the notification communication medium (No in step S53), the control unit 42 acquires the WAN notification information set to the location information table, and transmit the WAN notification information to the mobile phone communication network 6 through the communication network 5 using the WAN-ID set to the user information table as the destination for the newly entering terminal (step S55).

When the processing of steps S54 and S55 ends, when having determined that there is no wireless terminal 2 having newly entered a communication state in the AP communication area in step S51 (No in step S51), or when having determined that a newly entering terminal has not entered the wireless LAN access point 3 of the notification acquisition object in step S52 (No in step S52), the control unit 42 terminates the processing.

2. Second Embodiment

Next, a configuration of an information providing system according to a second embodiment will be described. While, in the information providing system 1 according to the first embodiment, the notification acquisition object is determined on the basis of the radio wave intensity and the stay time, in the information providing system according to the second embodiment, the notification acquisition object is determined by further adding a keyword specified by the terminal user.

Figure 16:
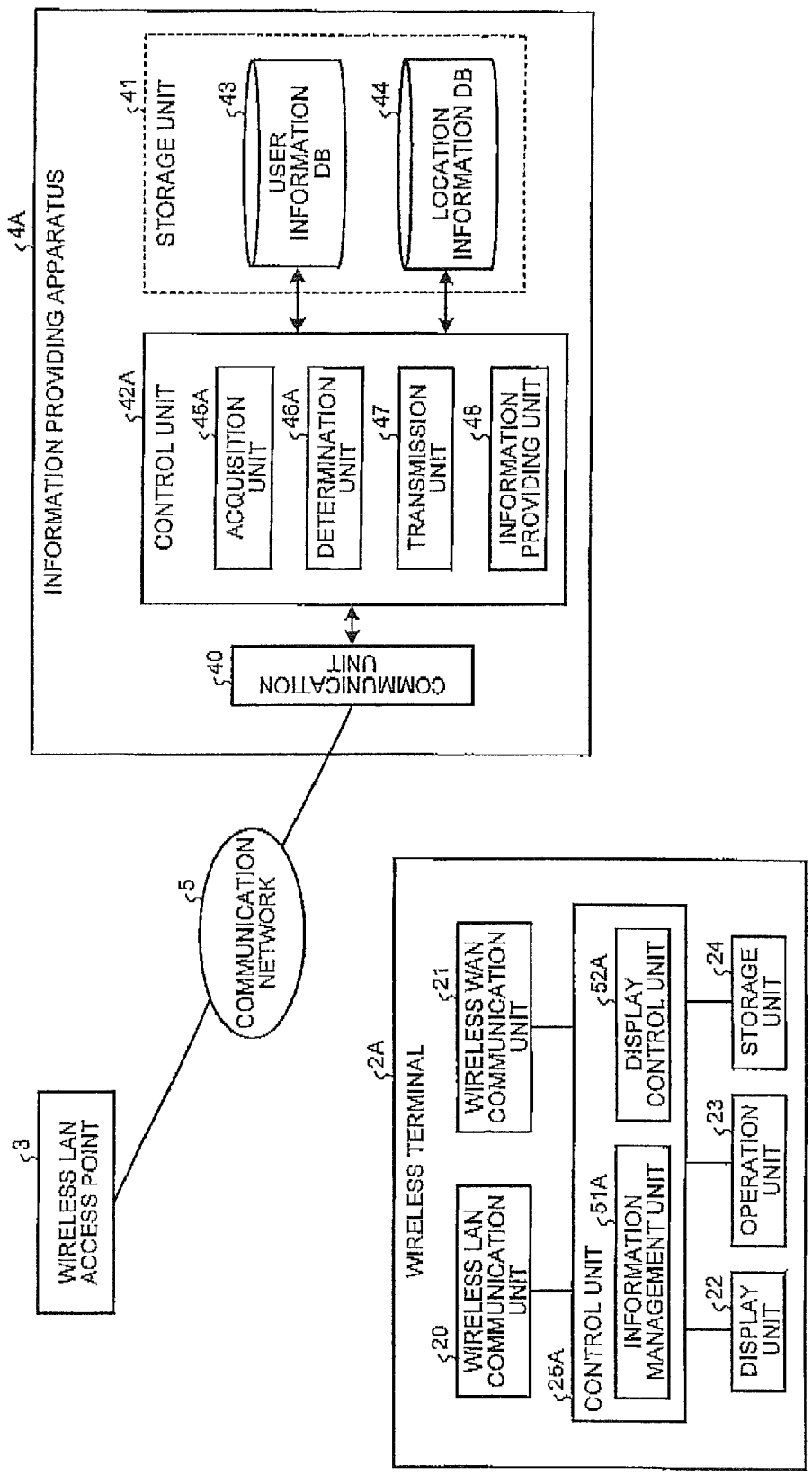
FIG. 16 is a diagram illustrating a specific configuration example of an information providing system according to a second embodiment.

FIG. 16 is a diagram illustrating a configuration of an information providing system 1A of the second embodiment. As illustrated in FIG. 16, the information providing system 1A according to the second embodiment includes a wireless terminal 2A, a wireless LAN access point 3, an information providing apparatus 4A, and the like. Note that, in FIG. 16, a mobile phone communication network 6, a mobile phone base station 7, gateway servers 8 and 9, and the like are omitted. Further, hereinafter, points different from the information providing system 1 according to the first embodiment will be mainly described, and configuration elements having similar functions to the first embodiment are denoted with the same reference signs and description is omitted.

The wireless terminal 2A includes a control unit 25A. The control unit 25A has a function to set a keyword by the user of the wireless terminal 2A and a function to transmit the set keyword to the information providing apparatus 4A, in addition to the function of the control unit 25 according to the first embodiment.

To be specific, the control unit 25A includes an information management unit 51A and a display control unit 52A. The display control unit 52A displays a setting screen of an information notification app in a display unit 22 on the basis of data stored in a storage unit 24. An input frame for inputting a keyword is set on the setting screen of the information notification app, and the user of the wireless terminal 2A performs operation to the display unit 22 or an operation unit 23 on the setting screen to input a keyword.

When the keyword is input by the user of the wireless terminal 2A, the information management unit 51A stores the input keyword in the storage unit 24. Further, the information management unit 51A transmits the keyword stored in the storage unit 24 to the information providing apparatus 4A together with information on candidates of the notification acquisition object through a wireless LAN communication unit 20 or a wireless WAN communication unit 21. The candidates of the notification acquisition object are determined on the basis of AP unit information by a method similar to the notification acquisition object according to the first embodiment.

The information providing apparatus 4A includes a control unit 42A. The control unit 42A sets the keyword from the wireless terminal 2A to a user information table, and determines a wireless LAN access point 3 of the notification acquisition object on the basis of the user information table, in addition to the function of the control unit 42 according to the first embodiment.

The control unit 42A includes an acquisition unit 45A and a determination unit 46A. When the keyword is transmitted from the wireless terminal 2A to the information providing apparatus 4A together with the information on the candidates of the notification acquisition object, the acquisition unit 45A sets the keyword to the user information table together with the information on the candidates of the notification acquisition object. FIG. 17 is a diagram illustrating an example of the user information table according to the second embodiment.

As illustrated in FIG. 17, information on notification object candidate APs and the keyword are set in the user information table corresponding to each user ID. The notification object candidate AP is an AP-LID of a wireless LAN access point 3 that serves as a candidate of a notification acquisition object of the wireless terminal 2A. In the example illustrated in FIG. 17, as the notification object candidate APs corresponding to a user ID "U1", "AL1", "AL2", and the like are set, and "Chinese food" is set as the keyword. Note that only one keyword is set corresponding to a user ID. However, two or more keywords can be set.

When the wireless terminal 2A has entered the AP communication area of the wireless LAN access point 3 that is the candidate of the notification acquisition object set to the user information table, the determination unit 46A determines, when the keyword set by the user of the wireless terminal 2A is included in the notification information on the wireless LAN access point 3, the wireless LAN access point 3 as the wireless LAN access point 3 of the notification acquisition object.

Figure 18:
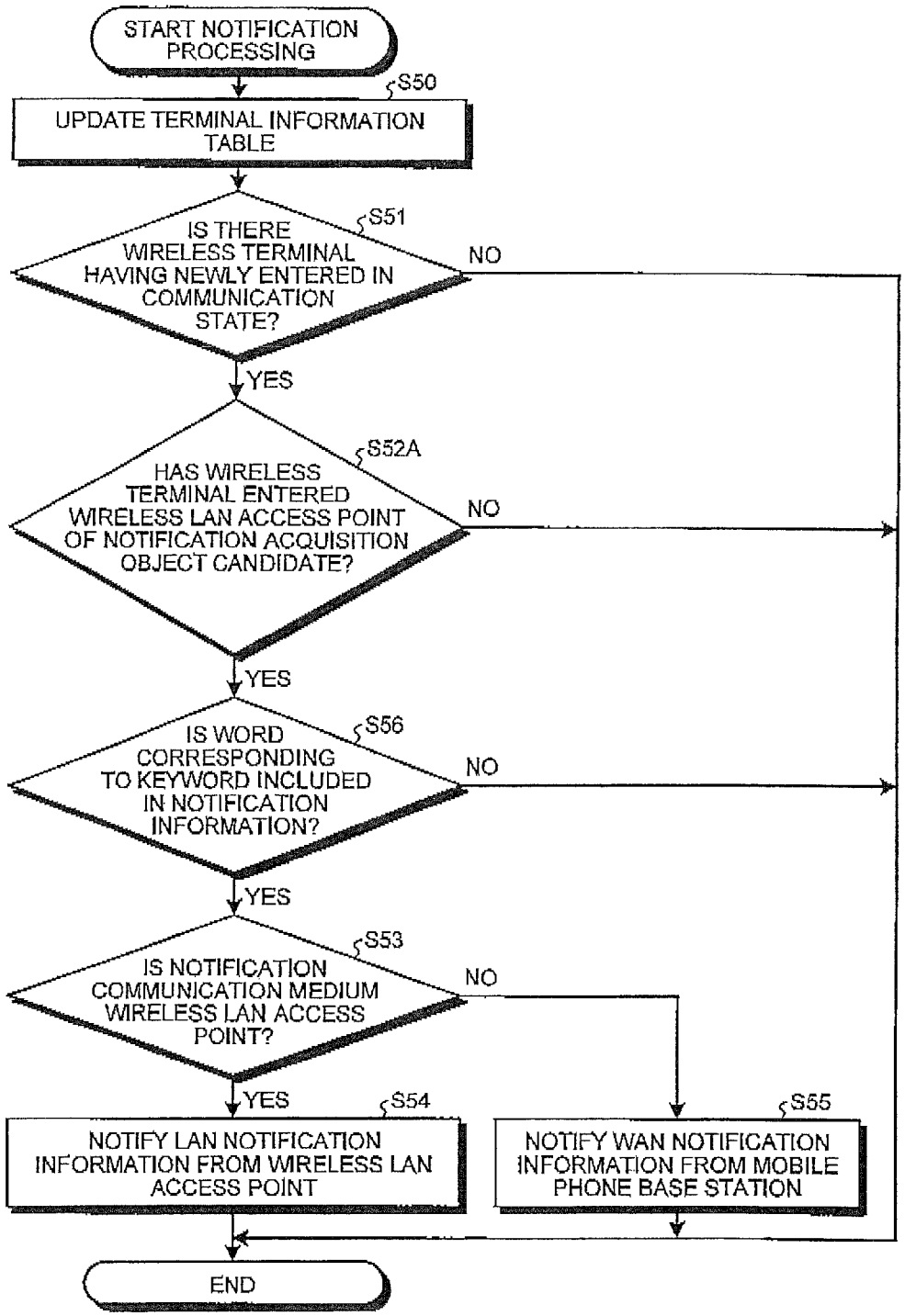
FIG. 18 is a flowchart of notification processing according to the second embodiment.

FIG. 18 is a flowchart of information processing in the information providing apparatus 4A, and is a diagram corresponding to FIG. 15. Note that steps S50, 351, and S53 to S55 illustrated in FIG. 18 are the same as steps S50, S51, and S53 to S55 illustrated in FIG. 15, and description is omitted.

As illustrated in FIG. 18, when having determined that there is a wireless terminal 2A having newly entered a communication state in the AP communication area (newly entering terminal) (Yes in step S51), the control unit 42A determines whether the wireless LAN access point 3 of the AP communication area that the newly entering terminal has entered is the wireless LAN access point 3 of the candidate of the notification acquisition object on the basis of the user information table (step S52A).

In step S52A, when having determined that the wireless LAN access point 3 of the AP communication area that the newly entering terminal has entered is the wireless LAN access point 3 of the candidate of the notification acquisition object (Yes in step S52A), the control unit 42A determines, in the user information table, whether a word corresponding to the keyword is included in the notification information corresponding to the wireless LAN access point 3 that the newly entering terminal has entered (step S56).

For example, when a newly entering terminal corresponding to the user ID "U1" has entered the AP communication area of the wireless LAN access point 3 that is the candidate of the notification acquisition object, the control unit 42A determines a wireless LAN access point 3 as the notification acquisition object if a word corresponding to "Chinese food" is included in the LAN notification information or the WAN notification information of the wireless LAN access point 3.

When a word corresponding to the keyword is included in the notification information corresponding to the wireless LAN access point 3 that the newly entering terminal has entered (Yes in step S56), the control unit 42A determines a transmission medium (notification communication medium) that notifies the notification information to be the wireless LAN access point 3 that the newly entering terminal has entered on the basis of the information on the notification object candidate AP (step S53).

When having determined that the wireless LAN access point 3 as the notification communication medium (Yes in step S53), the control unit 42A acquires the LAN notification information set to the location information table, and transmits the LAN notification information to the wireless LAN access point 3 using the terminal ID set to the user information table as the destination for the newly entering terminal (step S54). Meanwhile, when having determined the mobile phone base station 7 as the notification communication medium (No in step S53), the control unit 42A acquires the WAN notification information set to the location information table, and transmits the WAN notification information to the mobile phone communication network 6 through the communication network 5 using the WAN-ID set to the user information table as the destination for the newly entering terminal (step S55).

As described above, in the information providing system 1A according to the second embodiment, the reception of the notification information is restricted by the keyword set by the user of the wireless terminal 2A. Therefore, the information is not notified to the user of the wireless terminal 2A without any restriction, and the notification of the information can be appropriately performed without giving the user of the wireless terminal 2A an unpleasant feeling.

Note that, in the above description, the wireless LAN access point 3 of the notification acquisition object is determined on the basis of the keyword set by the user of the wireless terminal 2A from among the wireless LAN access points 3 of the candidates of the notification acquisition object determined on the basis of the radio wave intensity and the stay time. However, the control unit 42A can determine the wireless LAN-access point 3 of the notification acquisition object on the basis of only the keyword set by the user of the wireless terminal 2A.

In this case, all of the wireless LAN access points 3 can be used as the wireless LAN access points 3 of the notification acquisition object. However, a wireless LAN access point 3 in which an average radio wave intensity is a predetermined value or more and an average stay time is a predetermined value or more can be used as the notification acquisition object.

Further, a user attribute of the user of the wireless terminal 2A may be set to the user information table. In this case, the control unit 42A can set a keyword on the basis of the user attribute.

3. Third Embodiment

Next, a configuration of an information providing system according to a third embodiment will be described. In the information providing system 1 according to the first embodiment, the wireless terminal 2 transmits the information on the notification acquisition object to the information providing apparatus 4, and the information providing apparatus 4 transmits the notification information on the basis of the information on the notification acquisition object. Meanwhile, in an information providing system according to the third embodiment, a wireless terminal does not transmit information on a notification acquisition object to an information providing apparatus, and determines whether displaying notification information acquired from the information providing apparatus in a display unit 22 on the basis of the information on the notification acquisition object.

Figure 19:
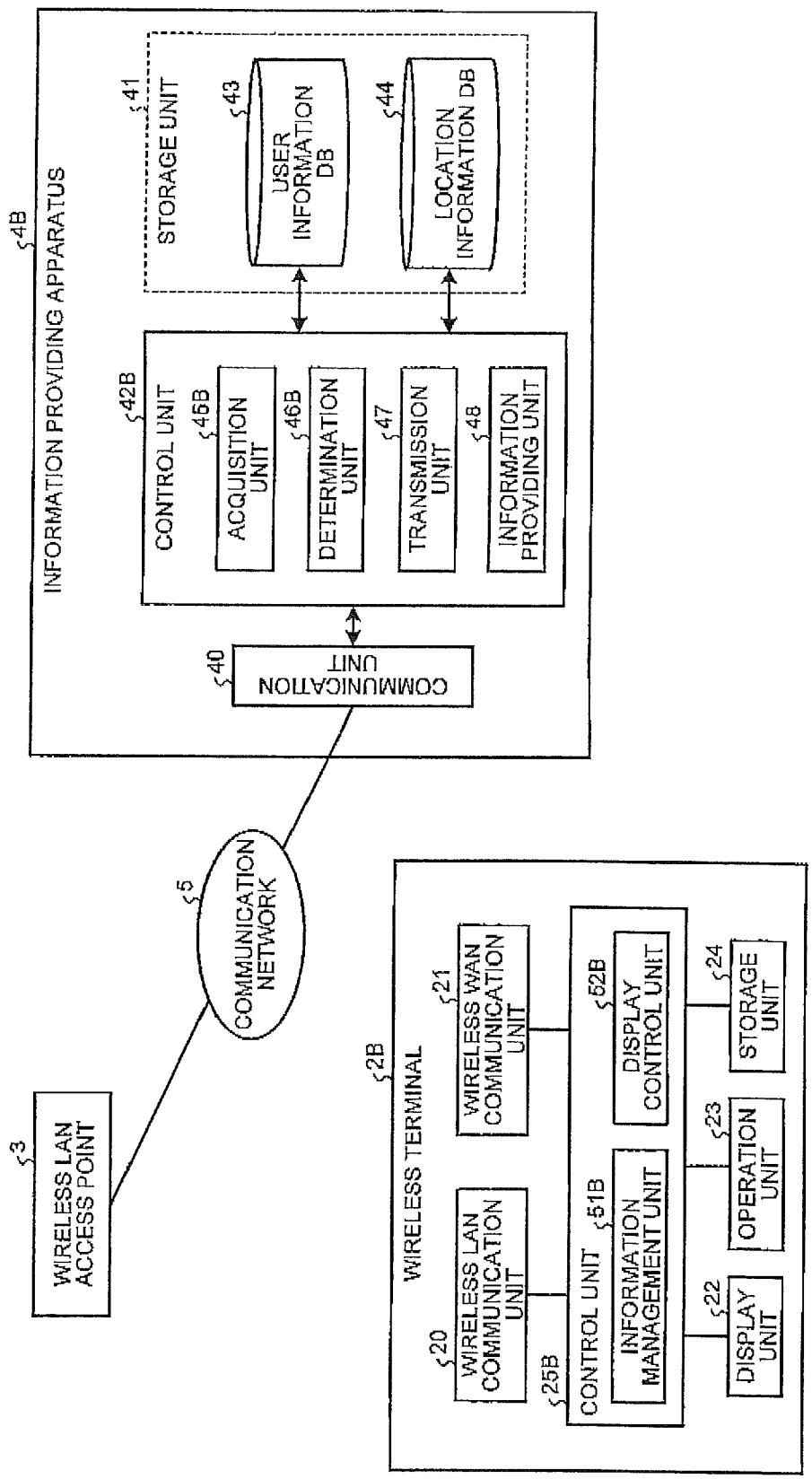
FIG. 19 is a diagram illustrating a specific configuration example of an information providing system according to a third embodiment.

FIG. 19 is a diagram illustrating a configuration of an information providing system 1B according to the third embodiment. As illustrated in FIG. 19, the information providing system 1B according to the third embodiment includes a wireless terminal 2B, a wireless LAN access point 3, an information providing apparatus 4B, and the like. Note that, in FIG. 19, a mobile phone communication network 6, a mobile phone base station 7, gateway servers 8 and 9, and the like are omitted. Further, hereinafter, points different from the information providing system 1 according to the first embodiment will be mainly described, and configuration elements having similar functions to the first embodiment are denoted with the same reference signs and description is omitted.

The wireless terminal 2B includes a control unit 25B. The control unit 25B does not transmit information on a notification acquisition object to the information providing apparatus 4B, and determine whether displaying notification information acquired from the information providing apparatus 4B in a display unit on the basis of the information on the notification acquisition object.

To be specific, the control unit 25B includes an information management unit 51B and a display control unit 52B. When having determined the notification acquisition object, the information management unit 51B stores information on the notification acquisition object in the storage unit 24. When having received the notification information from the information providing apparatus 4B, the display control unit 52B displays the notification information received from the information providing apparatus 4B in a display unit 22 when the notification information received from the information providing apparatus 4B is notification information of a wireless LAN access point 3 of the notification acquisition object.

Figure 20:
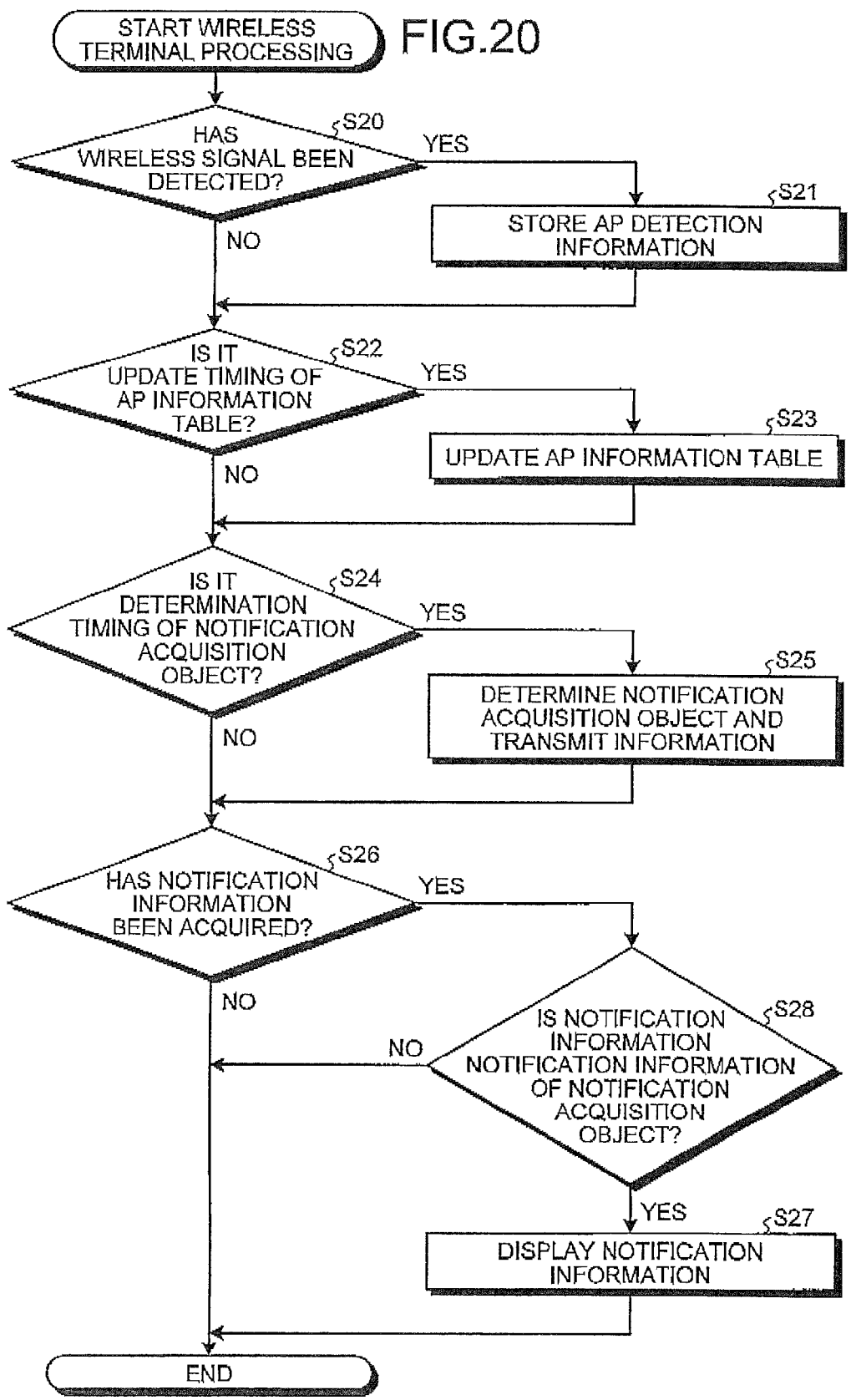
FIG. 20 is a flowchart of information processing in a wireless terminal according to the third embodiment.

FIG. 20 is a flowchart of information processing in the wireless terminal 2B. The operation is processing repeatedly executed by the control unit 25B of the wireless terminal 2B. Note that steps S20 to S24, S26, and S27 illustrated in FIG. 20 are the same as steps S20 to S24, S26, and S27 illustrated in FIG. 12, and description is omitted.

As illustrated in FIG. 20, when having determined to have acquired notification information (Yes in step S26), the control unit 25B of the wireless terminal 2B determines whether the acquired notification information is notification information of a wireless LAN access point 3 of a notification acquisition object stored in the storage unit 24 (step S28).

An AP-LID of wireless LAN access point 3 is associated with the notification information, and the control unit 25B determines the acquired notification information is the notification information of the wireless LAN access point 3 of the notification acquisition object when the AP-LID associated with the notification information is included in the AP-LID of the wireless LAN access point 3 of the notification acquisition object.

When having determined the acquired notification information is the notification information of the wireless LAN access point 3 of the notification acquisition object (Yes in step S28), the control unit 25B displays the acquired notification information in the display unit 22 (step S27).

The information providing apparatus 4B includes a control unit 42B. The control unit 42B includes an acquisition unit 45B and a determination unit 46B. Similarly to the acquisition unit 45, the acquisition unit 45B acquires terminal information, and updates a terminal information table of a location information DB 44. When a wireless terminal 2B has entered the AP communication area of the wireless LAN access point 3, the determination unit 46B acquires, for the wireless terminal 2B, the notification information of the wireless LAN access point 3 that the wireless terminal 2B has entered. That is, the determination unit 46B acquires the notification information independently of the notification acquisition object.

Figure 21:
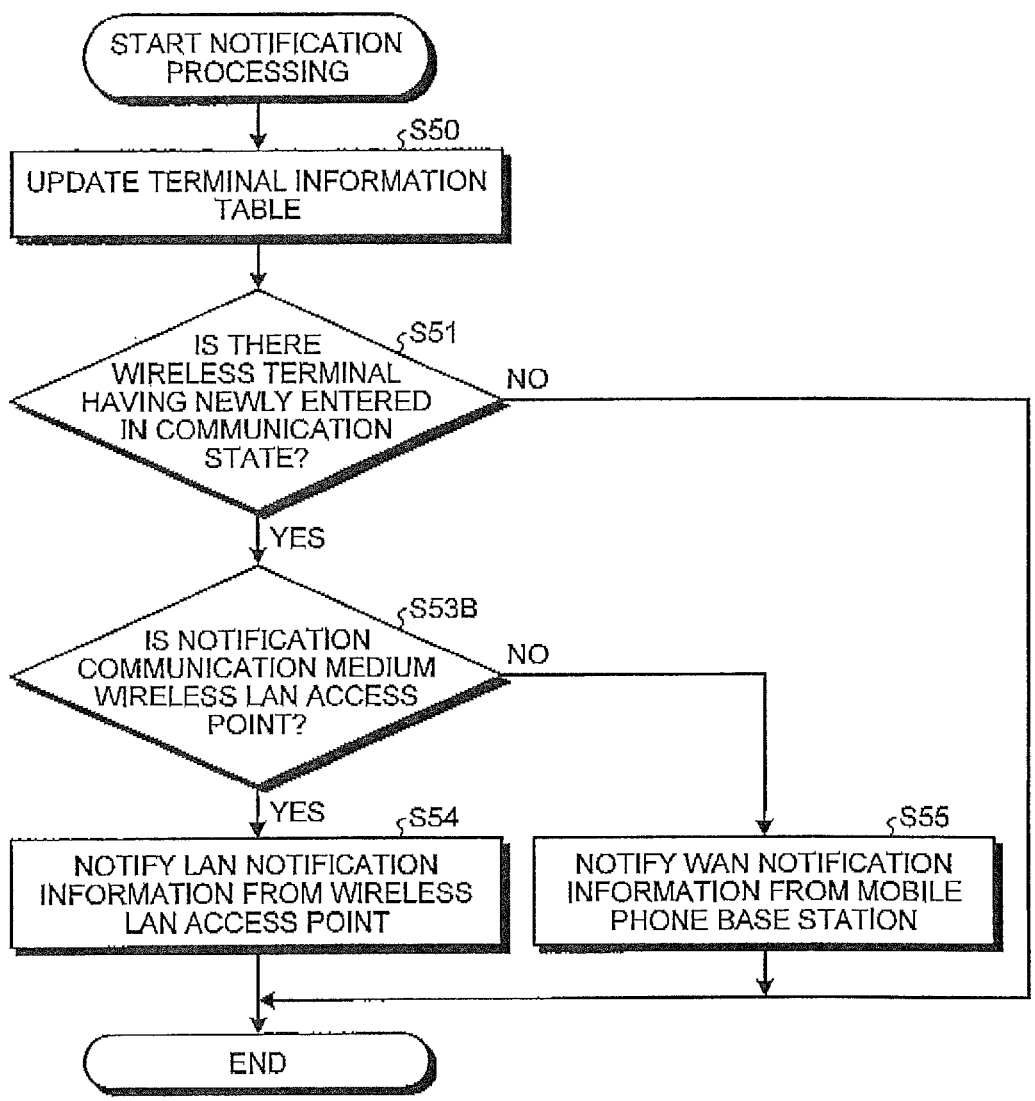
FIG. 21 is a flowchart of a notification processing according to the third embodiment.

FIG. 21 is a flowchart of information processing in the information providing apparatus 4B, and is a diagram corresponding to FIG. 15. Note that steps S50, S51, S54, and S55 illustrated in FIG. 21 are the same as steps S50, S51, S54, and S55 illustrated in FIG. 15, and description is omitted.

As illustrated in FIG. 21, when having determined that there is a wireless terminal 2B having newly entered a communication state in the AP communication area (newly entering terminal) (Yes in step S51), the control unit 42B determines whether radio wave intensity of the newly entering terminal is a predetermined threshold or more/a stay time is a predetermined threshold or more. When the radio wave intensity of the newly entering terminal is the predetermined threshold or more/the stay time is the predetermined threshold or more, the control unit 42B determines a transmission medium that notifies the notification information (notification communication medium) to be the wireless LAN access point 3 that the newly entering terminal has entered (step S53B).

When having determined the wireless LAN access point 3 as the notification communication medium (Yes in step S53B), the control unit 42B causes the wireless LAN access point 3 to notify the LAN notification information set to the location information table to the newly entering terminal (step S54). Meanwhile, when having not determined the wireless LAN access point 3 as the notification communication medium (No in step S53B), the control unit 42B causes the mobile phone communication network 6 to notify the WAN notification information set to the location information table to the newly entering terminal (step S55).

As described above, in the information providing system 1B according to the third embodiment, the wireless terminal 2B does not transmit the information on the notification acquisition object to the information providing apparatus 4B, and displays the notification information acquired from the information providing apparatus 4B in the display unit 22 on the basis of the information on the notification acquisition object. Therefore, the notification of the information can be appropriately performed in the wireless terminal 2B without making the processing in the information providing apparatus 4B complicate.

Note that in the information providing system 1B according to the third embodiment, a keyword can be set similarly to the second embodiment. That is, the control unit 25B of the wireless terminal 2B stores information on a keyword set by a display unit 22 or an operation unit 23 in the storage unit 24, and displays, in the display unit 22, the notification information corresponding to the keyword from among pieces of notification information corresponding to wireless LAN access points 3 of the notification acquisition object.

4. Modification

The above-described first and second embodiments, the information providing apparatus 4 (4A) acquires the information on the notification acquisition object from the wireless terminal 2 (2A). However, a notification acquisition object can be determined for each wireless terminal 2 (2A) on the basis of terminal information acquired from a wireless LAN access point 3 and can be set to a user information table.

To be specific, a control unit 42 (42A) of the information providing apparatus 4 (4A) obtains an average radio wave intensity, an average stay time, and the number of entrance in union of AP communication area for each terminal ID on the basis of a terminal information table, and determines the notification acquisition object on the basis of the information, similarly to the above-described processing. The control unit 42 (42A) sets information on an AP-LID corresponding to the determined notification acquisition object to the user information table. In doing so, the notification information can be notified to the wireless terminal 2 (2A) while reducing a processing load of the wireless terminal 2 (2A).

Further, in the above-described embodiments, the notification acquisition object is determined from among wireless LAN access points 3 of the AP communication areas that the wireless terminal 2 (2A) has entered in the predetermined term Ta. However, among the wireless LAN access points 3, the notification acquisition object may be determined from among the wireless LAN access points 3 that belong to an area range specified by the user.

In this case, an input frame for inputting the area range is set on a setting screen of an information notification app, and the user of the wireless terminal 2 (2A or 2B) can input the area range on the setting screen by performing an operation to the display unit 22 or the operation unit 23. A control unit 25 (25A or 25B) of the wireless terminal 2 (2A or 2B) transmits information on the area range to the information providing apparatus 4 (4A or 4B).

A control unit 42 (42A or 42B) of the information providing apparatus 4 (4A or 4B) sets the information on the area range acquired from the wireless terminal 2 (2A or 2B) to the user information table, and determines a wireless LAN access point 3 of the notification acquisition object from among wireless LAN access points 3 positioned in the area range.

Further, the control unit 25 (25A) of the wireless terminal 2 (2A) can include a non-determination mode in which the notification acquisition object is not determined. In the non-determination mode, the information on the notification acquisition object is not notified to the information providing apparatus 4 (4A). Therefore, the control unit 42 (42A) of the information providing apparatus 4 (4A) transmits the notification information to the wireless terminal 2 (2A) when the conditions of the radio wave intensity and the stay time of the wireless terminal 2 (2A) that has entered the wireless LAN access point 3 is satisfied, similarly to the control unit 42B.

Note that, when having displayed the notification information predetermined numbers of times or more in a predetermined term under a state of the non-determination mode, the control unit 25 (25A) of the wireless terminal 2 (2A) transfers to a first determination mode or a second determination mode, and can continue the first determination mode or the second determination mode during a predetermined term.

Further, in the above-described embodiments, the information providing apparatus 4 (4A) stores the notification information and transmits the notification information to the wireless terminal 2 (2A). However, the wireless LAN access point 3 may store the notification information and transmit the notification information to the wireless terminal 2 (2A).

Note that, in the above-described embodiments, the function to transmit the detection information on the wireless terminal 2 (2A or 2B) is performed in each wireless LAN access point 3. However, the function may be executed by a wireless LAN access point 3 for detection separately provided with the function to transmit the detection information of the wireless terminal 2 (2A or 2B). By separately providing the wireless LAN access point 3 for detection, the above-described information delivery service can be provided to a location where the wireless LAN access point 3 has already been installed by installing the wireless LAN access point 3 for detection.

5. Effects

As described above, the information providing system 1 (1A or 1B) according to the embodiments includes the wireless terminal 2 (2A or 2B), the wireless LAN access point 3, and the information providing apparatus 4 (4A or 4B). Further, the wireless terminal 2 (2A or 2B) includes the wireless LAN communication unit 20, the wireless WAN communication unit 21, the display unit 22 (an example of an indication unit), and the control unit 25 (25A or 25B), and the control unit 25 (25A or 25B) acquires, when a radio wave intensity of the AP wireless signal output from a wireless LAN access point detected by the wireless LAN communication unit 20 satisfies a predetermined condition, the notification information corresponding to the wireless LAN access point 3 in the wireless LAN communication unit 20 or the wireless WAN communication unit 21 and displays the notification information in the display unit 22.

With such a configuration, when the wireless terminal 2 (2A or 2B) has entered the AP communication area of the wireless LAN access point 3, the notification information corresponding to the wireless LAN access point 3 is notified to the wireless terminal 2 (2A or 2B). Therefore, when a wireless LAN access point 3 is installed in a store, for example, information on the store can be notified to the user of the wireless terminal 2 (2A or 2B) who has entered the store. Therefore, the information on the store can be effectively notified to the user of the wireless terminal 2 (2A or 2B). Further, for the user of the wireless terminal 2 (2A or 2B), information irrelevant to the store that the user entered is not disorderly notified, and the user of the wireless terminal 2 (2A or 2B) does not have an unpleasant feeling.

Furthermore, when the wireless terminal 2 (2A or 2B) has entered the AP communication area of the wireless LAN access point 3 in which the radio wave intensity of the AP wireless signal received from the wireless LAN access point 3 satisfies a predetermined condition, the wireless terminal 2 acquires and displays the notification information corresponding to the wireless LAN access point 3. Therefore, the user of the wireless terminal 2 (2A or 2B) can avoid a situation in which the notification information corresponding to the wireless LAN access point 3 that the terminal user has entered is displayed in the wireless terminal 2 (2A or 2B) without any restriction, and whereby the notification of information to the user of the wireless terminal 2 (2A or 2B) can be properly performed.

Further, the wireless terminal 2 (2A) includes the storage unit 24 that stores the history of the radio wave intensity of the AP wireless signal detected by the wireless LAN communication unit 20. The control unit 25 (25A) detects the wireless LAN access point 3 that satisfies a predetermined condition on the basis of the history of the radio wave intensity stored in the storage unit 24.

With such a configuration, the wireless LAN access point 3 that satisfies a predetermined condition can be determined in the wireless terminal 2 (2A), and the processing load in the information providing apparatus 4 (4A) can be reduced, for example.

Further, the control unit 25 (25A) notifies the information on the wireless LAN access point 3 that satisfies a predetermined condition to the information providing apparatus 4 (4A) through the wireless LAN communication unit 20 or the wireless WAN communication unit 21, and acquires the notification information corresponding to the wireless LAN access point 3 that satisfies a predetermined condition from the information providing apparatus 4 (4A) through the wireless LAN communication unit 20 or the wireless WAN communication unit 21.

With such a configuration, when the user of the wireless terminal 2 (2A) has entered the AP communication area of the wireless LAN access point 3, the information providing apparatus 4 (4A) can easily understand whether notifying the notification information, and can appropriately notify the notification information.

Further, the control unit 25B displays, in the display unit 22, the notification information corresponding to the wireless LAN access point 3 that satisfies a predetermined condition from among pieces of notification information corresponding to wireless LAN access points 3 acquired from the information providing apparatus 4B through the wireless LAN communication unit 20 or the wireless WAN communication unit 21.

With such a configuration, the wireless terminal 2B determines whether displaying the notification information acquired from the information providing apparatus 4B. Therefore, the processing load in the information providing apparatus 4B can be reduced, for example.

Further, the predetermined condition is a condition that the radio wave intensity of the wireless LAN access point 3 falls within a predetermined higher rank in an ranking determined on the basis of radio wave intensities of an AP wireless signals detected by the wireless LAN communication unit 20, and the control unit 25 (25A or 25B) acquires the notification information corresponding to a wireless LAN access point 3 falling within a predetermined higher rank in the ranking determined on the basis of the radio wave intensity of the AP wireless signal detected by the wireless LAN communication unit 20 through the wireless LAN communication unit 20 or the wireless WAN communication unit 21, and displays the notification information in the display unit 22.

With such a configuration, for example, from among the wireless LAN access points 3, the notification information corresponding to a wireless LAN access point 3, in which the user of the wireless terminal 2 (2A or 2B) passes through or stays in a location closer to the center of the AP communication area, is notified. Therefore, the notification information can be appropriately notified.

Further, the control unit 25 (25A or 25B) acquires the notification information corresponding to a wireless LAN access point 3 falling within the predetermined highest rank in the predetermined higher rank through the wireless LAN communication unit 20, and display the notification information in the display unit 22.

With such a configuration, even in a case where the notification information is information having a relatively large information amount, the notification information can be acquired in the wireless terminal 2 (2A or 2B) at a high speed by acquiring the notification information from a wireless LAN access point 3 that is in a better communication state with the wireless terminal 2 (2A or 2B).

Further, the control unit 25 (25A or 25B) acquires the notification information corresponding to a wireless LAN access point 3 falling outside the predetermined highest rank in the predetermined higher rank through the wireless WAN communication unit 21, and display the notification information in the display unit 22.

With such a configuration, even in a case of a wireless LAN access point 3 that is in a poor communication state with the wireless terminal 2 (2A or 2B), the notification information can be acquired through the wireless WAN communication unit 21, and the notification information can be obtained in the wireless terminal 2 (2A or 2B) at a high speed by using information having a relatively small information amount as the notification information, for example, and the notification information can be notified to the wireless terminal 2 (2A or 2B) at an appropriate timing.

Further, in the information providing apparatus 4 (4A), the location information DB 44 (an example of a notification information storage unit) stores the notification information corresponding to each of a plurality of wireless LAN access points 3, and the control unit 42 (42A) acquires a wireless LAN access point 3 in which the radio wave intensity of the wireless signal detected by the wireless LAN communication unit 20 of the wireless terminal 2 (2A) satisfies a predetermined condition as the information on the wireless LAN access point 3 of the notification acquisition object from the wireless terminal 2 or 2A, and transmits, to the wireless terminal 2 (2A) through the wireless LAN access point 3 or the mobile phone base station 7, the notification information corresponding to the wireless LAN access point 3.*of* the notification acquisition object from among pieces of notification information stored in the location information DB 44.

With such a configuration, the information on the store can be effectively notified to the user of the wireless terminal 2 (2A). Further, for the user of the wireless terminal 2 (2A), information irrelevant to the store that the user entered is not disorderly notified, and the user does not have an unpleasant feeling. Further, when the user of the wireless terminal 2 (2A) has entered the AP communication area of the wireless LAN access point 3, the information providing apparatus 4 (4A) can easily understand whether notifying the notification information, and can appropriately notify the notification information.

Further, the control unit 25A of the wireless terminal 2A transmits the information on the keyword set by the display unit 22 or the operation unit 23 (an example of an input unit)

to the information providing apparatus 4A, and the control unit 42A of the information providing apparatus 4A acquires the information on the keyword from the wireless terminal 2A, and transmits, to the wireless terminal 2A, the notification information corresponding to the keyword from among pieces of notification information corresponding to wireless LAN access points 3 of the notification acquisition object.

With such a configuration, the reception of the notification information is restricted by the keyword set by the user of the wireless terminal 2A. Therefore, the information is not notified to the user without any restriction, and the notification of the information can be appropriately performed without giving the user of the wireless terminal 2A an unpleasant feeling.

6. Others

Further, the above-described information providing apparatus 4 (4A and 4B) may be realized by a plurality of server computers. Further, depending on a function, the configuration thereof can be flexibly changed by being realized by calling an external platform or the like by an application programming interface (API), network computing, or the like. Further, a part of the functions of the above-described information providing apparatus 4 (4A and 4B) may be realized by the wireless LAN access point 3.

The wireless terminal, the information providing method, and the information providing system according to the present application have an effect of appropriately notifying a user of a wireless terminal of information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless terminal comprising:
a display;
a wireless Local Area Network (LAN) communication receiver/transmitter configured to detect a radio wave intensity of a wireless signal output from a wireless LAN access point;
a wireless Wide Area Network (WAN) communication receiver/transmitter; and
a processor configured to:
select the wireless LAN access point as a notification acquisition object based on first information, second information, and third information each satisfying a predetermined condition, the first information being the radio wave intensity of the wireless signal detected by the wireless LAN communication receiver/transmitter, the second information being a stay time of the wireless terminal in a wireless communication area of the wireless LAN access point, and the third information being a number of entrances to the wireless communication area of the wireless LAN access point;
acquire, by the wireless LAN communication receiver/transmitter or the wireless WAN communication receiver/transmitter, notification information including content related to a commercial space in which the wireless LAN access point is installed, when the wireless terminal re-enters the wireless communication area of the wireless LAN access point selected as the notification acquisition objet, after the notification acquisition object is selected; and
indicate the notification information on the display.

2. The wireless terminal according to claim 1, further comprising:
a non-transitory computer readable storage medium configured to store a history of the radio wave intensity of the wireless signal detected by the wireless LAN communication receiver/transmitter, wherein
the processor detects the wireless LAN access point that satisfies the predetermined condition based on the history of the radio wave intensity stored in the non-transitory computer readable storage medium.

3. The wireless terminal according to claim 1, wherein the processor:
notifies an information providing apparatus of information on the wireless LAN access point that satisfies the predetermined condition through the wireless LAN communication receiver/transmitter or the wireless WAN communication receiver/transmitter; and
acquires the notification information corresponding to the wireless LAN access point that satisfies the predetermined condition from the information providing apparatus through the wireless LAN communication receiver/transmitter or the wireless WAN communication receiver/transmitter.

4. The wireless terminal according to claim 1, wherein the processor acquires the notification information corresponding to the wireless LAN access point that satisfies the predetermined condition from among pieces of notification information corresponding to wireless LAN access points acquired from the information providing apparatus through the wireless LAN communication receiver/transmitter or the wireless WAN communication receiver/transmitter, and indicates the notification information with the display.

5. The wireless terminal according to claim 1, wherein
the predetermined condition is a condition that the radio wave intensity of the wireless LAN access point falls within a predetermined higher rank in an ranking determined on the basis of the radio wave intensities of the wireless signals detected by the wireless LAN communication receiver/transmitter, the predetermined higher rank including at least one wireless LAN access point that is closest to the wireless terminal based on the determined radio wave intensity of the at least one wireless LAN access point, and
the processor acquires notification information corresponding to a wireless LAN access point falling within the predetermined higher rank in the ranking determined on the basis of the radio wave intensity of the wireless signal detected by the wireless LAN communication receiver/transmitter through the wireless LAN communication receiver/transmitter or the wireless WAN communication receiver/transmitter, and indicates the notification information with the display.

6. The wireless terminal according to claim 5, wherein the processor acquires notification information corresponding to a wireless LAN access point falling within a predetermined highest rank in the predetermined higher rank through the wireless LAN communication receiver/transmitter, and indicates the notification information with the display.

7. The wireless terminal corresponding to claim 5, wherein the processor acquires notification information corresponding to a wireless LAN access point falling outside a predetermined highest rank in the predetermined higher rank through the wireless WAN communication receiver/transmitter, and indicates the notification information with the display.

8. The wireless terminal according to claim 1, wherein the content includes advertisement content related to the commercial space.

9. The wireless terminal according to claim 1, wherein the processor is configured to:
determine whether a radio wave intensity of a wireless signal output from each of a plurality of the wireless LAN access points and detected by the wireless LAN communication receiver/transmitter satisfies the predetermined condition; and
acquire, as the notification information, content related to a commercial space in which a wireless LAN access point among the plurality of the wireless LAN access points, of which a radio wave intensity of a wireless signal satisfies the predetermined condition, is installed, by the wireless LAN communication receiver/transmitter or the wireless WAN communication receiver/transmitter.

10. The wireless terminal according to claim 1, wherein the processor is configured to:
determine, as an acquisition target, a wireless LAN access point of which a radio wave intensity of a wireless signal satisfies the predetermined condition among a plurality of the wireless LAN access points, the wireless signal being output from the wireless LAN access point and detected by the wireless LAN communication receiver/transmitter;
transmit information on the acquisition target to an information providing apparatus via the wireless LAN communication receiver/transmitter or the wireless WAN communication receiver/transmitter; and
acquire, when the wireless terminal re-enters into an communication area of the acquisition target, as the notification information, content related to a commercial space in which the acquisition target is installed, by the wireless LAN communication receiver/transmitter or the wireless WAN communication receiver/transmitter, the content being transmitted from the information providing apparatus.

11. The wireless terminal according to claim 1, wherein the processor is configured to:
determine, as an acquisition target, a wireless LAN access point of which a radio wave intensity of a wireless signal satisfies the predetermined condition among a plurality of the wireless LAN access points, the wireless signal being output from the wireless LAN access point and detected by the wireless LAN communication receiver/transmitter;
store information on the acquisition target;
acquire, as the notification information, pieces of content respectively related to commercial spaces, in which the wireless LAN access points are installed, from the information providing apparatus via the wireless LAN communication receiver/transmitter or the wireless WAN communication receiver/transmitter; and
indicate, among the pieces of content, a piece of the content related to the commercial space in which the acquisition target is installed, on the display.

12. A non-transitory computer readable storage medium containing program instructions for indicating information, wherein execution of the program instructions by one or more processors of a computer system causes the one or more processors to perform:
detecting a radio wave intensity of a wireless signal output from a wireless Local Area Network (LAN) access point by a wireless LAN communication receiver/transmitter of the computer system;
select the wireless LAN access point as a notification acquisition object based on first information, second information, and third information each satisfying a predetermined condition, the first information being the radio wave intensity of the wireless signal detected by the wireless LAN communication receiver/transmitter, the second information being a stay time of the wireless terminal in a wireless communication area of the wireless LAN access point, and the third information being a number of entrances to the wireless communication area of the wireless LAN access point;
acquiring, through the wireless LAN communication receiver/transmitter or a wireless Wide Area Network (WAN) communication receiver/transmitter of the computer system, notification information including content related to a commercial space in which the wireless LAN access point is installed, when the wireless terminal re-enters the wireless communication area of the wireless LAN access point selected as the notification acquisition object, after the notification acquisition object is selected; and
indicating the acquired notification information with a display of the computer system.

13. An information providing method comprising:
detecting, by a wireless terminal, a radio wave intensity of a wireless signal output from a wireless Local Area Network (LAN) access point;
selecting, by the wireless terminal, the wireless LAN access point as a notification acquisition object based on first information, second information, and third information each satisfying a predetermined condition, the first information being the radio wave intensity of the wireless signal detected by the wireless LAN communication receiver/transmitter, the second information being a stay time of the wireless terminal in a wireless communication area of the wireless LAN access point, and the third information being a number of entrances to the wireless communication area of the wireless LAN access point;
transmitting, by an information providing apparatus to the wireless terminal, notification information including content related to a commercial space in which the wireless LAN access point is installed;
acquiring, by the wireless terminal, the notification information transmitted from the information providing apparatus, when the wireless terminal re-enters the wireless communication area of the wireless LAN access point selected as the notification acquisition object, after the notification acquisition object is selected; and
indicating, by the wireless terminal, the acquired notification information.

14. An information providing system comprising:
a wireless terminal;
a plurality of wireless Local Area Network (LAN) access points; and
an information providing apparatus, wherein
the wireless terminal includes
a display,
a wireless LAN communication receiver/transmitter,
a wireless Wide Area Network (WAN) communication receiver/transmitter, and a first processor configured to:
  transmit information on a wireless LAN access point based on first information, second information, and third information each satisfying a predetermined condition, to the information providing apparatus as information on a notification acquisition object, the first information being the radio wave intensity of the wireless signal detected by the wireless LAN communication receiver/transmitter, the second information being a stay time of the wireless terminal in a wireless communication area of the wireless LAN access point, and the third information being a number of entrances to the wireless communication area of the wireless LAN access point;
  acquire notification information including content related to a commercial space in which the notification acquisition object is installed, from the information providing apparatus through the wireless WAN communication receiver/transmitter or the wireless LAN communication receiver/transmitter, when the wireless terminal re-enters the wireless communication area of the wireless LAN access point selected as the notification acquisition object, after the notification acquisition object is selected; and
  indicate the notification information on the display, and
the information providing apparatus includes:
  a notification information non-transitory computer readable storage medium configured to store notification information including the content related to the commercial space in which each of the plurality of wireless LAN access points is installed, and
  a second processor configured to:
    acquire information on the notification acquisition object, and
    transmit the notification information including the content related to the commercial space in which the notification acquisition object is installed among pieces of notification information stored in the notification information non-transitory computer readable storage medium to the wireless terminal through a wireless LAN access point or a wireless WAN base station, when the wireless terminal re-enters the wireless communication area of the wireless LAN access point selected as the notification acquisition object, after the notification acquisition object is selected.

15. The information providing system according to claim 14, wherein
  the wireless terminal includes an input configured to input a keyword,
  the processor of the wireless terminal transmits information on the keyword set by the input to the information providing apparatus,
  the processor of the information providing apparatus acquires the information on the keyword from the wireless terminal, and transmits, to the wireless terminal, notification information corresponding to the keyword among pieces of notification information corresponding to wireless LAN access points of the notification acquisition object, and
  the processor of the wireless terminal acquires the notification information transmitted from the information providing apparatus through the wireless WAN communication receiver/transmitter or the wireless LAN communication receiver/transmitter, and indicates the notification information with the display.

* * * * *